US012636640B2

(12) United States Patent
Liu

(10) Patent No.: US 12,636,640 B2
(45) Date of Patent: May 26, 2026

(54) SUPERATOMIC MATERIAL, SOL, PREPARATION METHOD THEREFOR, AND APPLICATION THEREOF

(71) Applicant: Feng Liu, Shanghai (CN)

(72) Inventor: Feng Liu, Shanghai (CN)

(*) Notice: Subject to any disclaimer, the term of this patent is extended or adjusted under 35 U.S.C. 154(b) by 564 days.

(21) Appl. No.: 18/004,953

(22) PCT Filed: Jul. 21, 2020

(86) PCT No.: PCT/CN2020/103148
§ 371 (c)(1),
(2) Date: Jan. 10, 2023

(87) PCT Pub. No.: WO2022/016346
PCT Pub. Date: Jan. 27, 2022

(65) Prior Publication Data
US 2023/0234036 A1 Jul. 27, 2023

(51) Int. Cl.
| | |
|---|---|
| *B01J 23/00* | (2006.01) |
| *A01N 25/26* | (2006.01) |
| *A01N 59/16* | (2006.01) |
| *A01N 59/20* | (2006.01) |
| *A01P 1/00* | (2006.01) |
(Continued)

(52) U.S. Cl.
CPC .............. *B01J 23/50* (2013.01); *A01N 25/26* (2013.01); *A01N 59/16* (2013.01); *A01N 59/20* (2013.01); *A01P 1/00* (2021.08); *B01J 21/06* (2013.01); *B01J 23/06* (2013.01); *B01J 23/72* (2013.01); *B01J 35/39* (2024.01); *B01J 35/45* (2024.01);
(Continued)

(58) Field of Classification Search
None
See application file for complete search history.

(56) References Cited

U.S. PATENT DOCUMENTS

| | | | |
|---|---|---|---|
| 2002/0005145 A1 | 1/2002 | Sherman | |
| 2003/0013607 A1* | 1/2003 | Morikawa | B01J 21/063 |
| | | | 502/200 |

(Continued)

FOREIGN PATENT DOCUMENTS

| | | |
|---|---|---|
| CN | 102189271 A | 9/2011 |
| CN | 104190458 A | 12/2014 |

(Continued)

OTHER PUBLICATIONS

Grabowska et al, Modification of Titanium(IV) Dioxide with Small Silver Nanoparticles: Application in Photocatalysis, American Chemical Society, Journal of physical chemistry, 117, pp. 1955-1962 (Year: 2013).*

(Continued)

*Primary Examiner* — Stefanie J Cohen
(74) *Attorney, Agent, or Firm* — HSML P.C.

(57) ABSTRACT

Provided are a superatomic material, as well as a sol, a preparation method therefor, and application thereof. The superatomic material comprises a carrier and superatoms doped in the carrier, the superatoms being one or more of silver, copper, zinc superatoms and rare earth element superatoms, the scale of superatoms being 100-3000 pm, and the carrier being an inorganic carrier. The superatomic material and the sol have superior antimicrobial and antiviral properties, have a long service life, and are environmentally friendly.

20 Claims, 12 Drawing Sheets

(51) Int. Cl.

| | | |
|---|---|---|
| *B01J 21/06* | (2006.01) | |
| *B01J 23/06* | (2006.01) | |
| *B01J 23/50* | (2006.01) | |
| *B01J 23/72* | (2006.01) | |
| *B01J 35/39* | (2024.01) | |
| *B01J 35/45* | (2024.01) | |
| *B01J 35/77* | (2024.01) | |
| *B01J 37/03* | (2006.01) | |
| *B01J 37/04* | (2006.01) | |

(52) U.S. Cl.
CPC .............. *B01J 35/77* (2024.01); *B01J 37/038* (2013.01); *B01J 37/04* (2013.01)

(56) References Cited

U.S. PATENT DOCUMENTS

| | | | |
|---|---|---|---|
| 2016/0361714 A1 | 12/2016 | Chiang et al. | |
| 2019/0259503 A1* | 8/2019 | Rosenstrom | ........... G21B 3/002 |

FOREIGN PATENT DOCUMENTS

| | | |
|---|---|---|
| CN | 104475097 A | 4/2015 |
| CN | 106861762 A | 6/2017 |
| CN | 107127354 A | 9/2017 |
| CN | 107456983 A | 12/2017 |
| JP | 2012111694 A | 6/2012 |
| JP | 2013216942 A | 10/2013 |

OTHER PUBLICATIONS

Lian et al, Plasmonic silver quantum dots coupled with hierarchical TiO2 nanotube arrays photoelectrodes for efficient visible-light photoelectrocatalytic hydrogen evolution, scientific reports (Year: 2015).*

Sun et al, The selective deposition of silver nanoparticles onto {1 0 1} facets of TiO2nanocrystals with co-exposed {0 0 1}/{1 0 1} facets, and their enhanced photocatalytic reduction of aqueous nitrate under simulated solar illumination, applied catalysis B: Environmental 182, 85-93 (Year: 2016).*

Liu et al., A room temperature operated ammonia gas sensor based on Ag-decorated TiO2 quantum dot clusters, RSC Adv, 9, 24519-24526 (Year: 2019).*

Hao, Ding et al., "Nano-Antimicrobial Technology," Chemical Industry Press, Oct. 2007, p. 244 (3 pages with English abstract).

Huang, Y. et al., "Preparation and Performance of Ag-loaded TiO2 Based on DEA," Bulletin of the Chinese Ceraminc Society, vol. 33, No. 11, Nov. 2014, pp. 3010-3016 (with English abstract).

Lopez, P. et al., "Tetrahedral (T) Closed-Shell Cluster of 29 Silver Atoms & 12 Lipoate Ligands, [Ag29(R-α-LA)12](3-): Antibacterial and Antifungal Activity," ACS Appl. Nano Mater. 2018, 1, 1595-1602.

Yan, L., "The finding of transition-metal-doped binary superatoms: TM@Li15," J. Phys. B: At. Mol. Opt. Phys. 53(2020) 015101, 8 pages.

Kim, K. et al., "Elucidating the Doping Effect on the Electronic Structure of Thiolate-Protected Silver Superatoms by Photoelectron Spectroscopy," Angew. Chem. Int. Ed. 2019, 58, pp. 11637-11641.

Agnihotri, S., et al., "Size-controlled silver nanoparticles synthesized over the range 5-100 nm using the same protocol and their antibacterial efficacy," RSC Adv. 2014, 4, pp. 3974-3983.

Yi, H. et al., "Superatom-in-Superatom [RhH@Ag24(SPhMe2)18]2—Nanocluster," Angew. Chem. Int. Ed. 2021, 60, pp. 22293-22300.

Extended European Search Report issued for European Patent Application No. 20945825.6, dated Mar. 11, 2024, 12 pages.

Second Office Action issued for Chinese Patent Application No. 202080098915.4, dated Mar. 15, 2024, 15 pages including English machine translation.

International Search Report issued for International Patent Application No. PCT/CN2020/103148, Date of mailing: Mar. 25, 2021, 6 pages including English translation.

Written Opinion issued for International Patent Application No. PCT/CN2020/103148, Date of mailing: Mar. 25, 2021, 5 pages including partial English machine translation.

Ge Jinlong et al., "Preparation and photocatalytic activity of Ag-doping TiO2," New Checmical Materials, vol. 40, No. 6, 2012, pp. 94-96 (with English abstract).

Wu Quande et al., "Cluster, Ultrafine Particles and Their Functional Thin Films," Vacuum Science and Technology, 1992, pp. 349-362 (with English abstract).

Zhou Ting et al., "Preparation of TiO2 Ordered Porous Film Containing Silver Nano-Crystal and Its Optical Properties," Journal of the Chinese Ceramic Society, vol. 41, No. 6, Jun. 2013, pp. 825-830 (with English abstract).

Jiang Min, "Hydrothermal preparation of crystal copper," Journal of Baoji University of Arts and Sciences (Natural Science), vol. 25, No. 4, Dec. 2005, pp. 277-279 (with English abstract).

* cited by examiner

Comparative tests of Antivirus Performance of yellow leaf disease
virus (with nano silver as a control)

| Run | Pos. | KCps | Mob. | Zeta | Width | Time |
|-----|------|------|------|------|-------|------|
| 1 | 50.0 | 253.2 | -4.198 | -60.0 | 51.3 | 13:33:35 |
| 2 | 50.0 | 254.4 | -2.808 | -40.2 | 55.0 | 13:39:39 |
| 3 | 50.0 | 263.4 | -3.239 | -46.3 | 43.9 | 13:45:43 |
| Average | | 257.0 | -3.415 | -48.8 | 50.1 | |
| +/- | | 5.6 | 0.711 | 10.2 | 5.7 | |

| Rec.Mean(mV) | | Width(mV) | Cond.(mS/cm) | pH | Title |
|--------------|------|-----------|--------------|------|-------|
| 9 | -46.3 | 43.9 | 0.380 | 12.81 | AG2 |

Malvern Instruments Ltd, Malvern UK +44 1684 892456

SUPERATOMIC MATERIAL, SOL, PREPARATION METHOD THEREFOR, AND APPLICATION THEREOF

TECHNICAL FIELD

The present disclosure relates to the technical field of antibacterial materials, in particular to a super-atomic material, a sol, a preparation method therefor, and a use thereof.

BACKGROUND

As the quality of life of people improves, the demand for antibacterial materials gradually increases. At present, the antibacterial materials mainly include two types, one type is inorganic antibacterial materials represented by silver, titanium oxide, zinc oxide, and the like, and the other type is organic antibacterial materials represented by quaternary ammonium salt, chitosan and derivatives thereof. Among them, inorganic antibacterial materials have excellent antibacterial effects and are widely used. In particular, in silver-containing antibacterial materials, such as $Ag/TiO_2$ composite powder materials, silver generally exists in the form of ions or complexes, which can destroy bacterial cell membranes to enter bacterial cells and act with DNA of bacteria to cause the DNA to be highly concentrated and lose replication capacity, and can also bind to sulfhydryl groups of proteins to cause the protein inactive. The titanium oxide has photocatalytic performance, can lead to the death of microorganisms in a short time, and can further improve the antibacterial effect of such material. However, silver ions in such materials have high mobility and poor thermal stability, and are easy to migrate into the environment to cause environmental damage, and meanwhile, the migration of metal ions can cause the antibacterial life of the product to be greatly shortened.

SUMMARY

Accordingly, it is necessary to provide a super-atomic material, a sol, and a preparation method therefor, and a use thereof. The super-atomic material and the sol have longer service life and are environmentally friendly.

A super-atomic material includes a carrier and super atoms doped in the carrier. The super atoms are one or more selected from the group consisting of silver super atoms, copper super atoms, zinc super atoms, and rare earth element super atoms. The super atoms have a dimension of 100 pm to 3000 pm. The carrier is an inorganic carrier.

A sol includes the above-described super-atomic material.

A method for preparing a sol, includes the following steps of:

mixing metal salt, a carrier precursor, and water to obtain a mixed solution;

treating the mixed solution by the following methods to prepare a sol:

heating, heating the mixed solution to a temperature of 120° C. to 250° C. and increasing a pressure to 15 bar to 60 bar within 200 s;

heat preserving, reducing the pressure to 10 bar to 40 bar, controlling the temperature at 130° C. to 200° C., and preserving heat for 270 s to 330 s; and cooling, cooling to a temperature of 5° C. to 50° C. within 60 s;

wherein the metal salt is an organic salt or an inorganic salt containing silver, copper, zinc or rare earth elements;

the carrier precursor is an inorganic acid or an inorganic acid complex capable of generating an inorganic carrier by hydrothermal reaction.

An antimicrobial and antiviral coating includes the above-described super-atomic material.

An antimicrobial and antiviral coating is mainly prepared from the above-described sol or from the sol prepared by the above-described preparation method.

A use of the above-described super-atomic material, the sol, and the sol prepared by the preparation method in the preparation of daily necessities, cosmetics, paints, or sealants.

An antimicrobial and antiviral product includes a substrate and a super-atomic material loaded on the substrate. The super-atomic material is the above-described super-atomic material or the super-atomic material prepared from a sol. The sol is the above-described sol or the sol prepared by the above-described preparation method.

The above-described super-atomic material effectively improves the antimicrobial and antiviral effects of the super-atomic material by using the inorganic carrier doped with the super atoms in a specific particle size range. Moreover, the super-atomic material has a broad spectrum, can resist various microorganisms and viruses, and can effectively improve the application range. In addition, the content of metal elements in the super-atomic material can be reduced, so that the aim of reducing the toxicity of the super-atomic material is fulfilled, and the application range can be effectively expanded. Moreover, because the super atoms are not easy to migrate into the environment, the environmental pollution caused by the super-atomic material can be effectively avoided, and the service life of the super-atomic material can be prolonged.

DETAILED DESCRIPTION OF THE EMBODIMENTS

Figure 1:
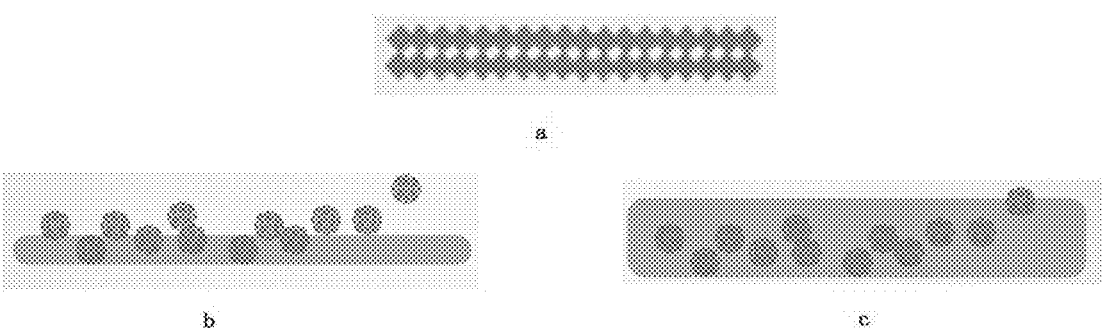
FIG. 1 is a schematic view of an antimicrobial and antiviral coating formed by a sol and antimicrobial and antiviral powders according to an embodiment of the present disclosure.

In order to facilitate the understanding of the present disclosure, the present disclosure will be described more fully below, and preferred embodiments of the present disclosure will be illustrated. However, the present disclosure can be implemented in many different forms and is not limited to the embodiments described herein. On the contrary, providing these embodiments is to assist understanding the contents disclosed by the present disclosure more fully and thoroughly.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure. The term "and/or" as used herein includes any and all combinations of one or more related listed items.

A super-atomic material according to an embodiment of the present disclosure includes a carrier and super atoms doped in the carrier. The super atoms are one or more selected from the group consisting of silver super atoms, copper super atoms, zinc super atoms, and rare earth element super atoms. The super atoms have a dimension of 100 pm to 3000 pm. The carrier is an inorganic carrier.

In the present disclosure, the "super atom" refers to an atomic cluster composed of more than two atoms, which has a critical structure between the nanometer particle and single atom. The super atom is not ion, and has its unique performance. Compared with ion or complex containing the ion, the super atom has a lower mobility, and is less likely to enter the environment. In addition, because the super atoms of the super-atomic material of the present disclosure are doped into the carrier, such that the super atoms are fixed on the carrier with a larger size, they will not enter the skin barrier. The super atoms (cluster) doped on the surface can provide extremely high activity, so that the super-atomic material combination can give consideration to the safety and high performance. Compared with the conventional antibacterial material, the super-atomic material not only has superior antimicrobial and antiviral performance, but also has higher environmental effect and safety, and can effectively avoid the environmental pollution caused by the metal element entering into the natural environment. Taking 2 nm of silver-containing complex material with better performance in the conventional product as an example, it can invade the skin system by several mm, which may bring unknown hazard.

Moreover, the above-described super atoms have a stronger nano-size effect. In terms of specific surface area only, the 2 nm silver super atoms have a theoretical equivalent specific surface area of 286 m$^2$/g, while the 15 nm nano silver which is common in the market has an equivalent specific surface area of 38 m$^2$/g, which will lead to great difference in performance. Because the super atoms of the above-described super-atomic material are not easy to enter the environment, the service life of the super-atomic material can be effectively prolonged, and compared with the conventional antibacterial material (generally 1 to 2 years), the service life of the super-atomic material can be prolonged to more than 5 years.

Furthermore, because the metal elements in the above-described super-atomic materials exist in a form of super atoms, the super-atomic material has superior bactericidal effect and require a lower amount of doped metal, which in turn makes the super-atomic materials themselves less toxic and can effectively expand the range of applications, for example, for the preparation of daily necessities, cosmetics, etc. Moreover, the above-described super-atomic material has strong dispersibility, and can be uniformly dispersed in solvents such as water and alcohol without agglomeration, thereby improving the processing performance of the material.

Further, the super atom has a dimension of 100 pm to 2500 pm. Further, the super atom has a dimension of 100 pm to 2300 pm. Further, the super atom has a dimension of 100 pm to 2200 pm. Further, the super atom has a dimension of 100 pm to 2100 pm. Further, the super atom has a dimension of 100 pm to 2000 pm. Further, the super atom has a dimension of less than 2000 pm and greater than or equal to 100 pm. Further, the super atom has a dimension of 100 pm to 1500 pm. Further, the super atom has a dimension of 100 pm to 1200 pm. Further, the super atom has a dimension of 100 pm to 1000 pm. Further, the super atom has a dimension of less than 1000 pm and greater than or equal to 100 pm. Further, the super atom has a dimension of less than or equal to 1000 pm and greater than 100 pm. Further, the super atom has a dimension of less than 1000 pm and greater than 100 pm. Furthermore, the super atom has a dimension of 200 pm to 800 pm. Furthermore, the super atom has a dimension of 300 pm to 500 pm.

Further, the above-described carrier is a carrier having quantum size. Further, the above-described carrier has a particle size of less than 10 nm. Furthermore, the above-described carrier has a particle size of 1 nm to 10 nm.

Further, the carrier is doped with at least silver super atoms.

Further, the carrier is doped with at least copper super atoms.

Further, the carrier contains silicon elements.

Further, the carrier is modified by a silicon-based substance to modify the surface of the carrier, so that the surface adhesion of the carrier is improved, the formation of a product with small and uniform particle size is facilitated, the service life of the super-atomic material is further prolonged, and environmental pollution is avoided.

Furthermore, the carrier is doped with a substance generated by hydrothermal reaction of a silicon-based substance.

It can be understood that, the "silicon-based substance" in the present disclosure refers to a silicon-containing substance acceptable in the field for surface modification of the carrier, including but not limited to: silicon oxide and substances capable of hydrolyzing to silicon oxide, such as alkoxysilanes. Further, it is preferred that the carrier is further doped with one or more selected from the group consisting of tetramethoxysilane, tetraethoxysilane, γ-glycidoxypropyltrimethoxysilane, γ-methacryloxypropyltrimethoxysilane, γ-aminopropyltriethoxysilane, and trimethoxysilane. These materials have superior surface modification effects and can further improve adhesion, as well as optimize the size of the super-atomic material and improve the uniformity of the particle size of the product.

The "carrier" in the present disclosure refers to an inorganic substance for doping the super atoms, and the specific type is not particularly limited, but can be an acceptable carrier substance in the field. Further, it is preferred that the carrier is a titanium-containing carrier to further improve the antimicrobial and antiviral performance of the super-atomic material. Furthermore, the carrier is one or more of titanium oxide, titanium nitride, or titanium peroxide. Furthermore, the carrier is a material having photocatalytic properties. Furthermore, the carrier is anatase titanium dioxide nanocrystal. The carrier is anatase titanium dioxide nanocrystal. Under the action of light, a large amount of ·OH and ·O can be generated on the surface of the titanium oxide, which can cause the death of microorganisms in a short time after contacting with the microorganisms, and there is a synergistic effect between the super atoms and the carrier, and the synergistic effect with the super atoms can improve the bactericidal efficiency and bactericidal effect of the super-atomic material.

Further, the super atoms are silver super atoms, and the carrier is anatase titanium dioxide nanocrystal. By utilizing the characteristic of photo-excited electron hole separation, the hole injection can excite silver atoms in the super atomic cluster to become in-situ transient high-valence silver ions, so that stronger antimicrobial and antiviral performance can be provided, without the high risk of silver ions, that are easily soluble in water, entering the environment and human body.

Further, the carrier is nitrogen interstitially doped titanium oxide. Furthermore, the super atoms are silver super atoms, and the carrier is nitrogen interstitially doped titanium oxide, to form an $Ag/N/TiO_2$ composite doped super-atomic material. The nitrogen interstitial doping improves the efficiency of electron hole pairs generated by $TiO_2$ after photoactivation, and Ag super atoms can be injected into the photo-generated holes to form in-situ transient high-valence silver ions, so that further performance improvement is brought.

Further, a width of at least one crystal face of the carrier is less than 10 nm. Further, the two-dimensional projection form of the carrier is quadrilateral, spindle-shaped, or circular.

Further, the surface of the carrier is charged (positively or negatively). Furthermore, an absolute value of the charge is greater than or equal to 15 mV. By charging the surface of the carrier, agglomeration can be avoided, and the dispersibility of the super-atomic material can be further improved.

By using the inorganic carrier doped with the super atoms in a specific particle size range, the above-described super-atomic material effectively improves the antimicrobial and antiviral effects of the super-atomic material, and can reduce the content of metal elements in the super-atomic material, so that the aim of reducing the toxicity of the super-atomic material is fulfilled, and the application range can be effectively expanded. Moreover, because the super atoms are not easy to migrate into the environment, the environmental pollution caused by the super-atomic material can be effectively avoided, and the service life of the super-atomic material can be prolonged.

The present disclosure further provides a sol, including the above-described super-atomic material. Because the above-described super-atomic material is in the form of carrier doped with super atoms, the sol has superior dispersion performance compared with the conventional antibacterial material, and a solvent can be used as a dispersant, which in turn prevents the super-atomic material from agglomerating and further improves the homogeneity of the sol. In addition, because the super atoms of the above-described super-atomic material are not easy to fall off or migrate into a solvent, the formed sol has a higher stability.

Further, the super-atomic material in the above-described sol is in a monodisperse state. Further, a ratio of dynamic light scattering (DLS) average particle size of the super-atomic material to X-Ray Diffraction (XRD) average particle size of the super-atomic material is less than 4, furthermore, less than 3, furthermore, less than 2.

FIG. 1 is a schematic view of coatings formed by antimicrobial and antiviral materials with different properties, wherein a in FIG. 1 is the coating formed by the sol of the present disclosure, and b and c in FIG. 1 are coatings formed by antimicrobial and antiviral powders prepared by conventional preparation methods. As shown in a in FIG. 1, because the super-atomic materials of the present disclosure can be uniformly dispersed in a solvent to form a sol in a monodisperse state, and because the super-atomic materials of the present disclosure have excellent adsorption effect, the super-atomic materials can be directly coated without additionally using an adhesive and the like. After the coating is dried, the super-atomic materials are uniformly arranged, forming a denser and more regular mesh structure, which in turn makes the whole coating have strong strength and toughness. In addition, because there are no adhesives and other reagents to cover the coating, more super-atomic materials are exposed, which in turn can improve the antimicrobial and antiviral effects of the coating. As shown in b and c in FIG. 1, the conventional powder-like materials (namely antimicrobial and antiviral powders) need to use in combination with adhesives and other reagents to form the coatings. The amount of the adhesive is too small, the powder-like materials are easy to fall off (as shown in b in FIG. 1), and a large amount of adhesive will wrap the powder-like materials, so that the antimicrobial and antiviral performance of the coating may be affected to a certain extent (as shown in c in FIG. 1).

It can be understood that, the solvent in the above-described sol may be selected according to the actual circumstances of the application field, and is not particularly limited herein and should not be construed as limiting the present disclosure. Further, the solvent is water or ethanol. Furthermore, in the sol, the solvent has a mass percentage of less than 90%.

Further, the sol may further contain additives acceptable in the field to further improve the dispersibility of the super-atomic material, and some functional additives may also be added, which are not particularly limited herein and should be understood as falling within the scope of the present disclosure.

The present disclosure further provides a method for preparing the above-described sol, including the following steps.

At S101, a metal salt, a carrier precursor, and water are mixed to obtain a mixed solution.

The carrier precursor is an inorganic acid or an inorganic acid complex capable of generating an inorganic carrier by hydrothermal reaction, and the specific type of the carrier precursor can be selected according to the type of the carrier selected. In one embodiment, the carrier precursor is a titanium-containing inorganic acid or titanium-containing inorganic acid complex. Further, the carrier precursor is one or more selected from the group consisting of peroxotitanic acid, orthotitanic acid, peroxotitanic acid complex, and orthotitanic acid complex. Further, the carrier precursor contains at least one of peroxotitanic acid complex or orthotitanic acid complex, and a complexing agent is introduced into the mixed solution to form a sol having excellent physical properties.

The inorganic acid complex can be obtained from commercially available raw materials or can be prepared by conventional methods. Specifically, it can be prepared by mixing an inorganic acid, a complexing agent, and a solvent, and stirring and reacting for a predetermined time. It should be noted that the prepared inorganic acid complex can be separated for the preparation of the sol, or the reaction solution can be directly used for the preparation of the sol without separation. In addition, the inorganic acid complex can be prepared simultaneously with the sol mixed solution, i.e., the metal salt, the inorganic acid, the complexing agent, and water are mixed to prepare the mixed solution, which is understood to be all within the protection scope of the present disclosure.

Further, the complexing agent is one or more selected from the group consisting of peroxide (such as hydrogen peroxide), tartaric acid, malic acid, and citric acid. In the above-described mixed solution system, the complexing agent can promote the formation of sol having excellent physical properties, so that the subsequent processing and application are facilitated.

In the present disclosure, the "metal salt" refers to a salt containing a desired metal element. Specifically, the metal salt is an organic or inorganic salt containing silver, copper, zinc, or rare earth elements. Furthermore, the metal salt is one or more selected from the group consisting of silver acetate, silver nitrate, silver sulfate, copper nitrate, zinc nitrate, zinc sulfate, and copper sulfate. Furthermore, the metal salt is silver acetate or silver nitrate.

Further, the step S101 further includes a step of adding a silicon-based substance. Furthermore, the silicon-based substance is one or more selected from the group consisting of tetramethoxysilane, tetraethoxysilane, γ-glycidyl etheroxypropyltrimethoxysilane, γ-methacryloyloxypropylt-rimethoxysilane, γ-aminopropyltriethoxysilane, and trimethoxysilane, so as to modify the surface of the carrier and further improve the surface adhesion of the carrier.

Further, the step S101 further includes a step of adding ammonia, trimethylamine, or ammonium salt. Furthermore, the amount of the added ammonia or ammonium salt is a trace amount. Furthermore, the amount of ammonia or ammonium salt is 4% to 6% of the oxygen element content in the carrier, so as to facilitate the preparation of the nitrogen-doped super-atomic material.

Further, the step S101 includes the following steps.

At S1011, the metal salt and water are mixed to obtain a first solution.

Further, in the step S1011, the mixing is performed at a temperature of 25° C. to 35° C. to fully dissolve the metal salt. Furthermore, preferably, the water is first heated to 25° C. to 35° C., and then the metal salt is added.

Further, in the first solution, the metal element has a concentration of 10 ppm to 1000 ppm; furthermore, the metal element has a concentration of 100 ppm to 800 ppm; furthermore, the metal element has a concentration of 300 ppm to 600 ppm.

At S1012, the carrier precursor and water are mixed to obtain a second solution.

Further, in the step S1012, the mixing is performed at a temperature of 15° C. to 25° C. to fully dissolve the carrier precursor. Furthermore, preferably, the water is first heated to 15° C. to 25° C., and then the carrier precursor is added.

It can be understood that, the step S1011 and step S1012 are not performed sequentially, and the step S1011 may be performed prior to step S1012, or step S1012 may be performed prior to step S1011.

Further, the carrier precursor has a concentration of 1% to 30%.

At step S1013, the first solution is dropped into the second solution at a speed of 100 mL/min to 200 mL/min, and stirred to obtain a mixed solution.

By dropping the first solution into the second solution at a fixed speed, the metal ions can be homogeneously dispersed in the solution, so as to avoid the coating of inorganic acids or inorganic acid complexes, improve the homogeneity of the mixed solution, and facilitate the subsequent steps.

At step S102, the mixed solution is treated by the following methods to prepare a sol:

heating, including heating the mixed solution to a temperature of 120° C. to 250° C. and increasing a pressure to 15 bar to 60 bar within 200 s;

heat preserving, including reducing the pressure to 10 bar to 40 bar, controlling the temperature at 130° C. to 200° C., and preserving heat for 270 s to 330 s; and cooling, including cooling to a temperature of 5° C. to 50° C. within 60 s.

By adopting a critical hydrothermal heating process of rapid heating-avalanche cooling, the super atoms having the dimension between the nanoparticles and the ions can be generated, and the carrier can be rapidly crystallized, which enables to maintain the carrier crystals with strong homogeneity, less agglomeration and smaller size, which in turn makes the obtained sols have strong antimicrobial and antiviral properties and long service life. Hydrothermal reaction may form crystals such as titanium oxide, and may also reduce silver precursors, copper precursors, or the like to elementary substances. However, the conventional hydrothermal process is long, which results in crystallization with a wide range of particle sizes and large particles. The inventor have found that the key is that the crystallization is completed at a high temperature point, and the slower heating process will lead to larger particles, so that the size of the super atoms can be controlled to the maximum extent on the basis of the completion of crystallization and super-atomic synthesis by adopting a method of rapid heating and rapid cooling. If the conventional method is adopted, 1) it is difficult to obtain carriers such as nano titanium oxide with quantum size and the like, and agglomeration and precipitation can be generated; 2) the super atoms can also grow into nanometallic particles without special performance; and 3) the super atoms are separated from the titanium oxide and precipitated, and the super-atomic materials with the super atoms doped in the carrier cannot be formed.

In addition, the above-described method enables the surface of the super-atomic material dispersed in the sol to be charged by not less than 15 mV, so that the occurrence of agglomeration can be effectively avoided, and the stability of the sol is improved.

Further, the above-described critical hydrothermal heating process of rapid heating-avalanche cooling is less time consuming, the whole process does not exceed 10 min, which can significantly improve the production efficiency. Compared with the conventional high-temperature calcination method, the method has the advantages that the temperature is lower, the super-atomic activity can be prevented from being damaged by high temperature, the super atoms can be prevented from being condensed into nanoparticles, so as to avoid the growth of quantum dot crystals into nanoparticles with agglomerates, and reduce energy consumption, which is suitable for industrial production applications.

The heating, heat preserving, and cooling may be performed by using an existing apparatus, and is not particularly limited herein.

Further, in the heating step, the temperature and pressure are increased to target values within 200 s. Further, the temperature and pressure are increased to target values within 195 s. Further, the temperature and pressure are increased to target values within 190 s. Further, the temperature and pressure are increased to target values within 188 s. Further, the temperature and pressure are increased to target values within 185 s. Further, the temperature and pressure are increased to target values within 180 s. Further, the temperature and pressure are increased to target values within 170 s.

Further, in the heating step, the target temperature is 130° C. to 220° C. Furthermore, the target temperature is 140° C. to 210° C. Furthermore, the target temperature is 145° C. to 200° C. Furthermore, the target temperature is 150° C. to 180° C. Furthermore, the target temperature is 155° C. to 175° C. Furthermore, the target temperature is 157° C. to 170° C. Furthermore, the target temperature is 155° C. to 168° C. Furthermore, the target temperature is 156° C. to 167° C. Furthermore, the target temperature is 157° C. to 166° C. Furthermore, the target temperature is 158° C. to 165° C. Furthermore, the target temperature is 159° C. to 164° C. Furthermore, the target temperature is 162° C.

Further, in the heating step, the target pressure is 12 bar to 60 bar. Furthermore, the target pressure is 15 bar to 50 bar. Furthermore, the target pressure is 15 bar to 40 bar. Furthermore, the target pressure is 15 bar to 30 bar. Furthermore, the target pressure is 16 bar to 29 bar. Furthermore, the target pressure is 17 bar to 25 bar. Furthermore, the target pressure is 18 bar to 24 bar. Furthermore, the target pressure is 19 bar to 22 bar.

Further, in the heating step, the mixed solution is heated to a temperature of 130° C. to 220° C. and a pressure is increased to 12 bar to 50 bar within 200 s. Further, in the heating step, the mixed solution is heated to a temperature of 135° C. to 210° C. and a pressure is increased to 15 bar to 40 bar within 200 s. Further, in the heating step, the mixed solution is heated to a temperature of 150° C. to 200° C. and a pressure is increased to 18 bar to 22 bar within 200 s. Further, in the heating step, the mixed solution is heated to a temperature of 150° C. to 200° C. and a pressure is increased to 18 bar to 22 bar within 180 s. Further, in the heating step, the mixed solution is heated to a temperature of 150° C. to 180° C. and a pressure is increased to 18 bar to 22 bar within 180 s.

Further, in the heating step, the heating is in a speed ranging from 50° C./min to 51° C./min. Furthermore, the heating is in a speed ranging from 50.1° C./min to 50.9° C./min. Furthermore, the heating is in a speed ranging from 50.2° C./min to 50.8° C./min. Furthermore, the heating is in a speed ranging from 50.3° C./min to 50.7° C./min.

Further, in the heat preserving step, the pressure is 10 bar to 40 bar. Furthermore, the pressure is 10 bar to 30 bar. Furthermore, the target pressure is 10 bar to 20 bar. Furthermore, the target pressure is 12 bar to 18 bar. Furthermore, the target pressure is 13 bar to 17 bar. Furthermore, the target pressure is 14 bar to 16 bar.

Further, in the heat preserving step, the temperature is 150° C. to 180° C. Furthermore, the temperature is 155° C. to 170° C. Furthermore, the temperature is 155° C. to 166° C. Furthermore, the temperature is 156° C. to 165° C. Furthermore, the temperature is 157° C. to 164° C. Furthermore, the temperature is 158° C. to 162° C. Furthermore, the temperature is 160° C.

Further, in the heat preserving step, the heat is preserved for 270 s to 330 s. Furthermore, the heat is preserved for 280 s to 320 s. Furthermore, the heat is preserved for 290 s to 310 s. Furthermore, the heat is preserved for 292 s to 308 s.

Further, in the heat preserving step, the pressure is reduced to 10 bar to 40 bar, the temperature is controlled at 150° C. to 180° C., and the heat is preserved for 270 s to 330 s. Further, in the heat preserving step, the pressure is reduced to 15 bar to 30 bar, the temperature is controlled at 150° C. to 170° C., and the heat is preserved for 270 s to 330 s. Further, in the heat preserving step, the pressure is reduced to 15 bar to 21 bar, the temperature is controlled at 150° C. to 160° C., and the heat is preserved for 300 s to 320 s.

Further, in the cooling step, a temperature is cooled to 5° C. to 50° C. within 65 s. Furthermore, in the cooling step, a temperature is cooled to 5° C. to 50° C. within 60 s. Further, in the cooling step, a temperature is cooled to 5° C. to 40° C. within 60 s. Further, in the cooling step, a temperature is cooled to 10° C. to 30° C. within 60 s.

Further, in the cooling step, the cooling is in a speed ranging from 120° C./min to 140° C./min. Furthermore, in the cooling step, the cooling is in a speed ranging from 122° C./min to 138° C./min. Furthermore, in the cooling step, the cooling is in a speed ranging from 123° C./min to 137° C./min. Furthermore, in the cooling step, the cooling is in a speed ranging from 124° C./min to 136° C./min. Furthermore, in the cooling step, the cooling is in a speed ranging from 125° C./min to 135° C./min.

Furthermore, in the heating step, the heating is in a speed ranging from 50° C./min to 51° C./min; in the heat preserving step, the pressure is 15 bar to 21 bar, the temperature is 154° C. to 160° C., and the time is 300 s to 312 s; and in the cooling step, the cooling is in a speed ranging from 125° C./min to 135° C./min.

The above-described method for preparing the sol can form monodisperse sol through a rapid crystallization technology directly synthesized in liquid, which allows the surface of the sols to be maintained stable by a double electric layer without the need for surfactants. In this way, after the above-described sol is coated on the surface of an object, the evaporation of water will bring about the disappearance of the double electric layer and the first contact between the particles occurs. Because the nanoparticles of the carrier are less than 10 nm, have an extremely strong surface effect and a large number of active-broken chemical bonds on the surface, chemical bridging occurs between the particles to form inorganic mineral films, and the whole process does not require film-forming substances, so that it does not wrap the active substances and affect the performance (as shown in FIG. 1a).

The present disclosure also provides an antimicrobial and antiviral powder including the above-described super-atomic material.

The present disclosure also provides a method for preparing the above-described antimicrobial and antiviral powder, including the following step of: drying the above-described sol, and grinding to obtain the antimicrobial and antiviral powder. The method for preparing the sol is as described in S101 to S102 or S201 to S203, and will not be repeated herein again.

Further, the method for preparing the antimicrobial and antiviral powder includes the following steps.

At S301, the metal salt, the carrier precursor, and water are mixed to obtain a mixed solution.

The carrier precursor is an organic salt capable of generating an inorganic carrier by hydrothermal reaction.

The step S301 is the same as the step S101 except that there is no complexing agent in the mixed solution system, which will not be repeated herein.

At S302, the mixed solution is treated by the following methods to prepare a suspension:

heating, including heating the mixed solution to a temperature of 120° C. to 250° C. and increasing a pressure to 15 bar to 60 bar within 200 s;

heat preserving, including reducing the pressure to 10 bar to 40 bar, controlling the temperature at 130° C. to 200° C., and preserving heat for 270 s to 330 s; and cooling, including cooling to a temperature of 5° C. to 50° C. within 60 s.

The step S302 is the same as the step S102 and will not be repeated herein.

At S303, the suspension is dried to obtain the antimicrobial and antiviral powder.

The drying can be performed by using existing methods, such as vacuum drying, spray drying, or freeze drying, which can be selected according to the actual needs.

The present disclosure also provides an antimicrobial and antiviral coating including the above-described super-atomic material. The super-atomic material is as described above and will not be described herein.

The present disclosure also provides another antimicrobial and antiviral coating, which is mainly prepared from the above-described sol or from the sol prepared by the above-described preparation method.

It can be understood that the above-described sol may be applied to a target region and then dried. Due to the superior adhesion of the above-described sol and the ability of the super-atomic material to form a regularly arranged mesh structure after coating, the use of reagents such as adhesives can be avoided, effectively improving the antimicrobial and antiviral performance of the antimicrobial and antiviral coating.

The uses of the above-described antimicrobial and antiviral coating are not particularly limited, for example, they can be applied to indoor wall decoration, coated on glass or fibers, etc.

The present disclosure also provides a use of the above-described super-atomic materials, sols, and sols prepared by the above-described preparation method in the preparation of daily necessities, paints or sealants. Since the above-described super-atomic materials have excellent antimicrobial and antivirus properties and are not easy to migrate into the environment, they have high safety and environmental effects and are suitable for use in daily necessities, cosmetics, paints or sealants.

The present disclosure also provides an antimicrobial and antiviral product including a substrate and a super-atomic material loaded on the substrate. The super-atomic material is the above-described super-atomic material or the super-atomic material prepared from a sol. The sol is the above-described sol or the sol prepared by the above-described preparation method.

Further, the substrate is zeolite, molecular sieve, inorganic oxide, or fiber. Furthermore, the substrate is a zeolite with a particle size of 0.1 μm to 2 μm, a molecular sieve with a particle size of 0.1 μm to 2 μm, an inorganic oxide with a particle size of 0.1 μm to 2 μm, or hollow fibers.

It should be noted that the method for preparing the above-described antimicrobial and antiviral product is not particularly limited, and the substrate may be immersed in a solution or sol containing the super-atomic material, and then dried.

The following specific examples are given to illustrate the present disclosure.

Example 1

(1) 2 g of silver acetate was added into 500 ml of water for stirring, heated to 40° C., and stirred for about 1 hour for fully dissolving, then cooled to room temperature, and filtered to obtain a first solution.

(2) 5 kg (2% wt) of orthotitanic acid complex (citric acid) aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. After the highest temperature was reached, the pressure was reduced to 15 bar, the temperature was preserved at 160° C. for 300 seconds. Then, the pressure was increased to 12 bar, the avalanche refrigeration program was carried out to reduce the solution temperature to 30° C. within 60 seconds (programmed cooling speed of 130° C./min) to obtain the desired sol of nano titanium dioxide doped with silver super atoms.

Example 2

(1) 2 g of silver sulfate was added into 500 ml of water for stirring, heated to 40° C., and stirred for about 1 hour for fully dissolving, then cooled to room temperature, and filtered to obtain a first solution.

(2) 5 kg (2% wt) of peroxotitanic acid aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) To the mixed solution was added 0.05 ml of aqueous ammonia (30%).

(5) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. The highest temperature was reached after about 192 seconds, then the pressure was reduced to 15 bar, and the temperature was preserved at 160° C. for 300 seconds. Then, the pressure was increased to 12 bar, the avalanche refrigeration program was carried out to reduce the solution temperature to 30° C. within 60 seconds (programmed cooling speed of 130° C./min) to obtain the desired $Ag/N/TiO_2$ composite doped sol.

Example 3

(1) 2 g of silver nitrate was added into 500 ml of water for stirring, heated to 40° C., and stirred for about 1 hour for fully dissolving, then cooled to room temperature, and filtered to obtain a first solution.

(2) 5 kg (2% wt) of peroxotitanic acid aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) To the mixed solution was added 0.05 ml of aqueous ammonia (30%).

(5) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.8° C./min). The highest temperature was 165° C. After the highest temperature was reached, the pressure was reduced to 15 bar, and the temperature was preserved at 160° C. for 308 seconds. Then, the pressure was increased to 12 bar, the avalanche refrigeration program was carried out to reduce the solution temperature to 30° C. within 60 seconds (programmed cooling speed of 130° C./min) to obtain the desired Ag/N/TiO$_2$ composite doped sol.

Example 4

(1) 2 g of silver nitrate was added into 500 ml of water for stirring, heated to 40° C., and stirred for about 1 hour for fully dissolving, then cooled to room temperature, and filtered to obtain a first solution.

(2) 5 kg (2% wt) of peroxotitanic acid aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) To the mixed solution was added 0.05 ml of aqueous ammonia (30%).

(5) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. After the highest temperature was reached, the pressure was reduced to 15 bar, and the temperature was preserved at 160° C. for 300 seconds. Then, the pressure was increased to 12 bar, the avalanche refrigeration program was carried out to reduce the solution temperature to 30° C. within 60 seconds (programmed cooling speed of 132° C./min) to obtain the desired Ag/N/TiO$_2$ composite doped sol.

Example 5

(1) 2 g of silver acetate was added into 500 ml of water for stirring, heated to 40° C., and stirred for about 1 hour for fully dissolving, then cooled to room temperature, and filtered to obtain a first solution.

(2) 5 kg (2% wt) of peroxotitanic acid aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) 10 g of tetramethoxysilane was slowly dropped into the mixed solution and stirred for 30 minutes.

(5) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. The highest temperature was reached after about 192 seconds, then the pressure was reduced to 15 bar, and the temperature was preserved at 160° C.

for 300 seconds. Then, the pressure was increased to 12 bar, the avalanche refrigeration program was carried out to reduce the solution temperature to 30° C. within 60 seconds (programmed cooling speed of 130° C./min) to obtain the desired sol of silicon-surface-modified nano titanium dioxide doped with silver super atoms.

Example 6

(1) 2 g of copper sulfate was added into 500 ml of water for stirring, heated to 40° C., and stirred for about 1 hour for fully dissolving, then cooled to room temperature, and filtered to obtain a first solution.

(2) 5 kg (2% wt) of orthotitanic acid complex (citric acid) aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. The highest temperature was reached after about 192 seconds, then the pressure was reduced to 15 bar, and the temperature was preserved at 160° C. for 300 seconds. Then, the pressure was increased to 12 bar, the avalanche refrigeration program was carried out to reduce the solution temperature to 30° C. within 60 seconds (programmed cooling speed of 130° C./min) to obtain the desired sol of nano titanium dioxide doped with copper super atoms.

Example 7

(1) 2 g of zinc nitrate was added into 500 ml of water for stirring, heated to 40° C., and stirred for about 1 hour for fully dissolving, then cooled to room temperature, and filtered to obtain a first solution.

(2) 5 kg (2% wt) of orthotitanic acid complex (malic acid) aqueous solution was taken, and water was added to dilute the aqueous solution to 10 kg (1% wt) to obtain a second solution.

(3) The first solution was dropped into the second solution at a speed of 150 ml/min and fully stirred to obtain a mixed solution.

(4) To the mixed solution was added 0.05 ml of triethylamine.

(5) The mixed solution was treated in the following way by adopting a nano-supercritical segmented programmable hydrothermal reactor with an avalanche refrigeration module (commercial model Nano hydrosynthesis SHSUC). The pressure was increased to 20 bar (the heating speed was 50.6° C./min). The highest temperature was 162° C. The highest temperature was reached after about 192 seconds, then the pressure was reduced to 15 bar, and the temperature was preserved at 160° C. for 300 seconds. Then, the pressure was increased to 12 bar, the avalanche refrigeration program was carried out to reduce the solution temperature to 30° C. within 60 seconds (programmed cooling speed of 130° C./min) to obtain the desired Zn/N/TiO$_2$ composite doped sol.

Effect Verification Experiment

1. Verification Experiment of Existence Form of Super Atoms

Figure 2:
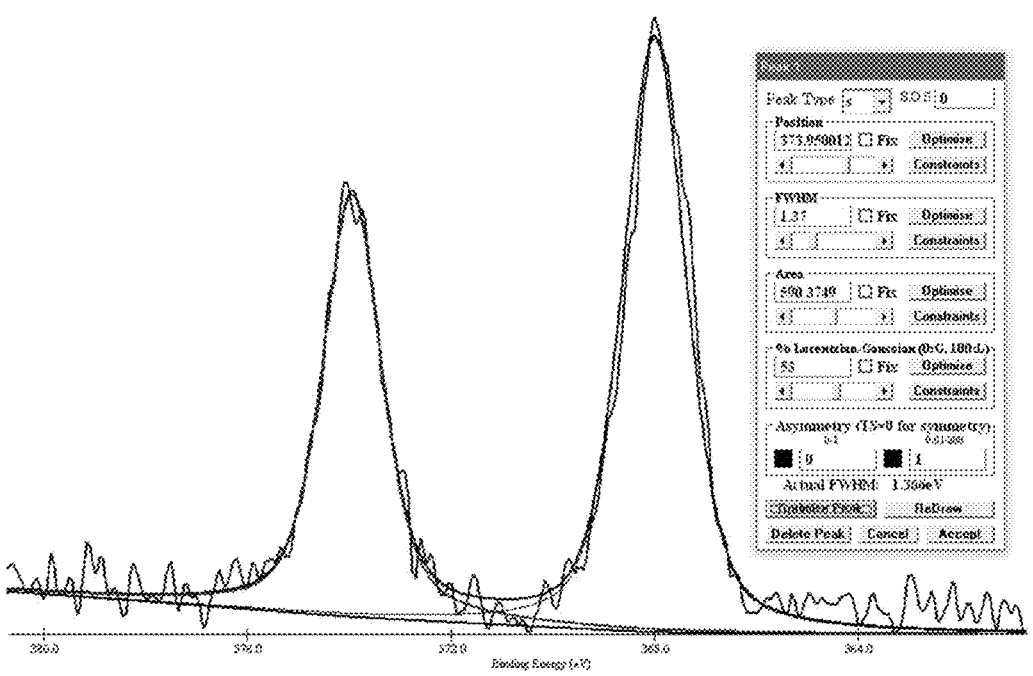
FIG. 2 is an X-ray photoelectron spectroscopy (XPS) pattern of a sol of Example 2.
Figure 2:
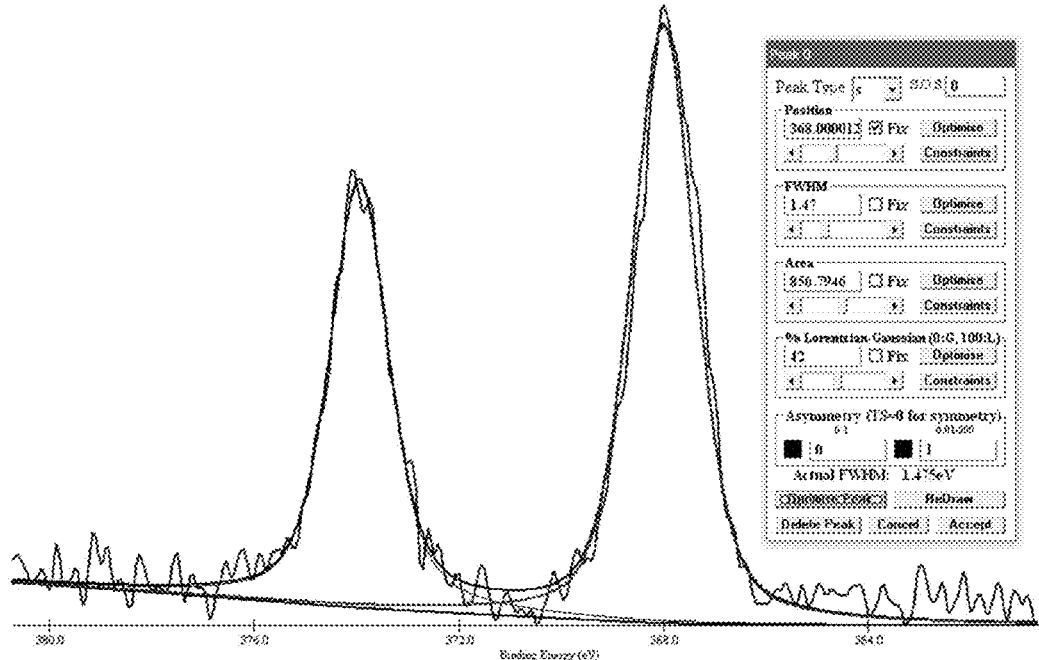

A. XPS Study (1) The XPS spectrum of the Ag/N/TiO$_2$ composite doped sol of Example 2 is shown in FIG. 2, and the specific data are shown in Table 1 below:

TABLE 1

| Sample | Track | Peak position | Peak area |
|---|---|---|---|
| Silver super-atomic sample | Ag 3d5/2 | 368.000 | 857 |
| | Ag 3d3/2 | 373.950 | 590 |
| Silver element | Ag 3d5/2 | 368 | |
| | Ag 3d3/2 | 374 | |

The data samples of the silver element are obtained from Handbook of X-ray Photoelectron Spectroscopy of PE Inc. It can be seen from the comparison that the silver super atoms have the same valence as the silver element, which proves that the super atoms do not exist in an ionic state.

Figure 3:
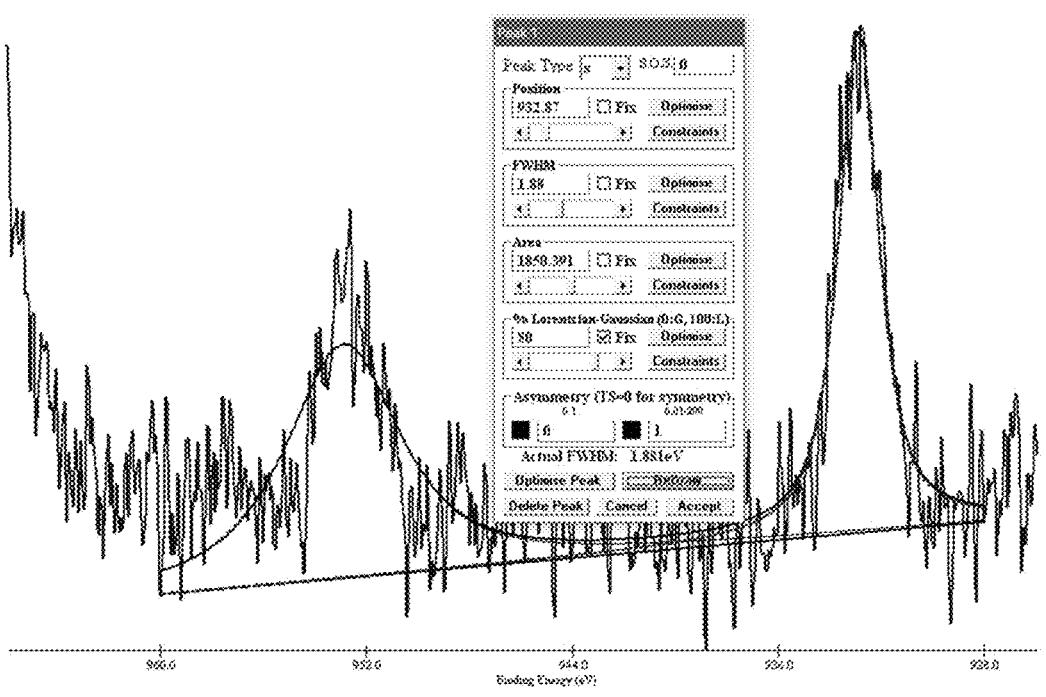
FIG. 3 is an XPS spectrum of a sol of Example 6.
Figure 3:
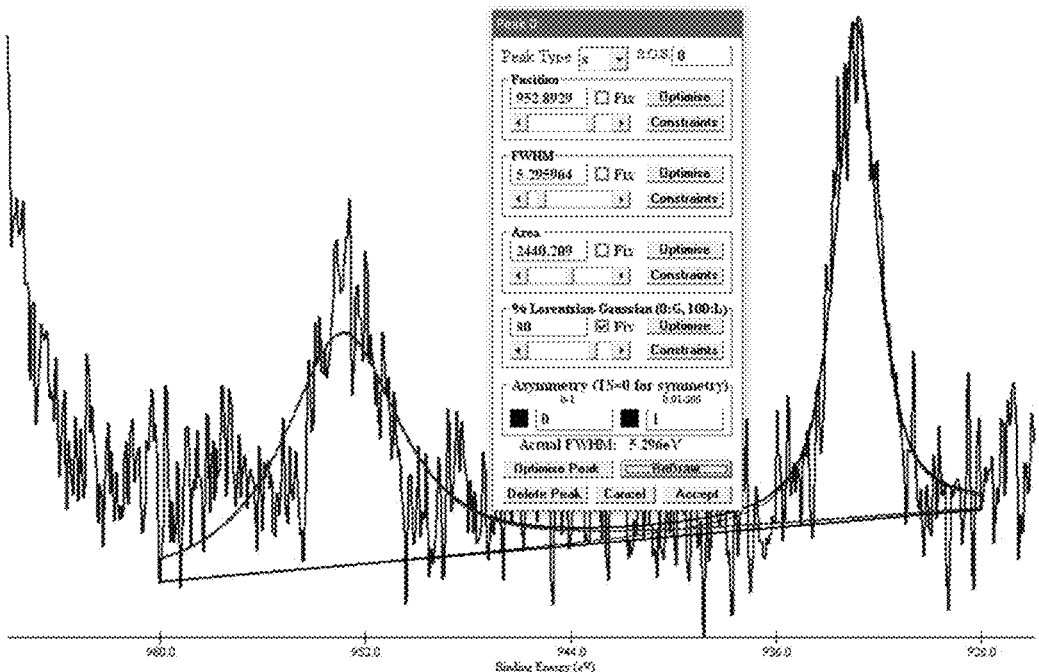

(2) The XPS spectrum of the sol of nano titanium dioxide doped with copper super atoms of Example 6 is shown in FIG. 3, and the specific data are shown in Table 2 below:

TABLE 2

| Sample | Track | Peak position | Peak area |
|---|---|---|---|
| Copper super-atomic sample | Cu2p (1) | 932.870 | 1850 |
| | Cu2p (2) | 952.893 | 2440 |
| Copper element | Cu2p (1) | 933 | |
| | Cu2p (2) | 953 | |

The data samples of the copper element are obtained from Handbook of X-ray Photoelectron Spectroscopy of PE Inc. It can be seen from the comparison that the copper super atoms have the same valence as the copper element, which proves that the super atoms do not exist in an ionic state.

B. Ultrafiltration and Nanofiltration Experiments:

The experimental method and the principle thereof were as follows. The Ag/N/TiO$_2$ composite doped sol was subjected to ultrafiltration (cross flow filtration), with the interception hole of 10 nm to 200 nm. The separated permeate liquid was analyzed by ICP-AES and ICP-MS, and neither silver nor titanium was detected. Because the nano titanium oxide carrier could be intercepted by ultrafiltration, silver super atoms were loaded on the carrier and therefore could not pass through the ultrafiltration membrane. If there are silver ions, free silver super atoms or complex ultra-small nano silver, the silver element can be detected in the permeate liquid through ultrafiltration.

C. (High Resolution) Electron Microscope EDX Studies

Figure 5:
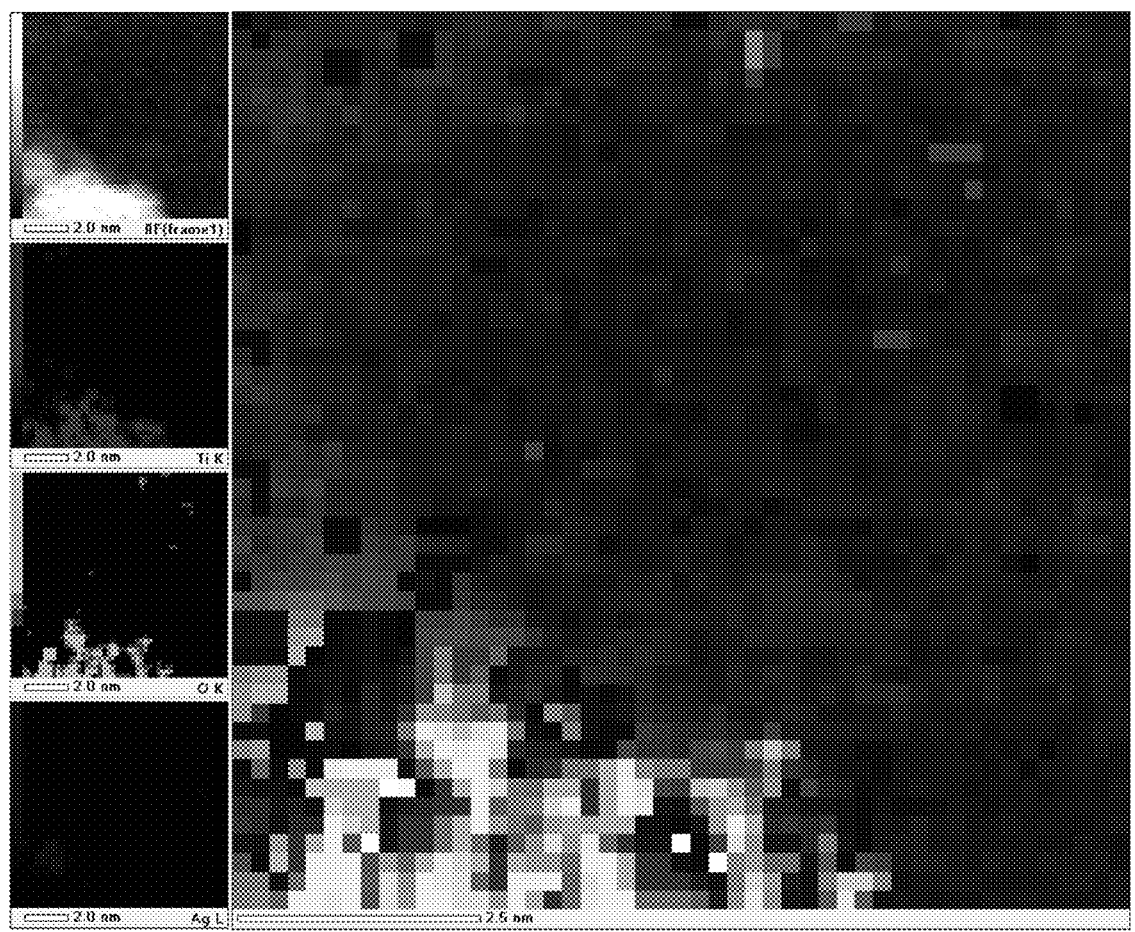
FIG. 5 is a (high-resolution) electron microscope diagram of the sol of Example 2.
Figure 6:
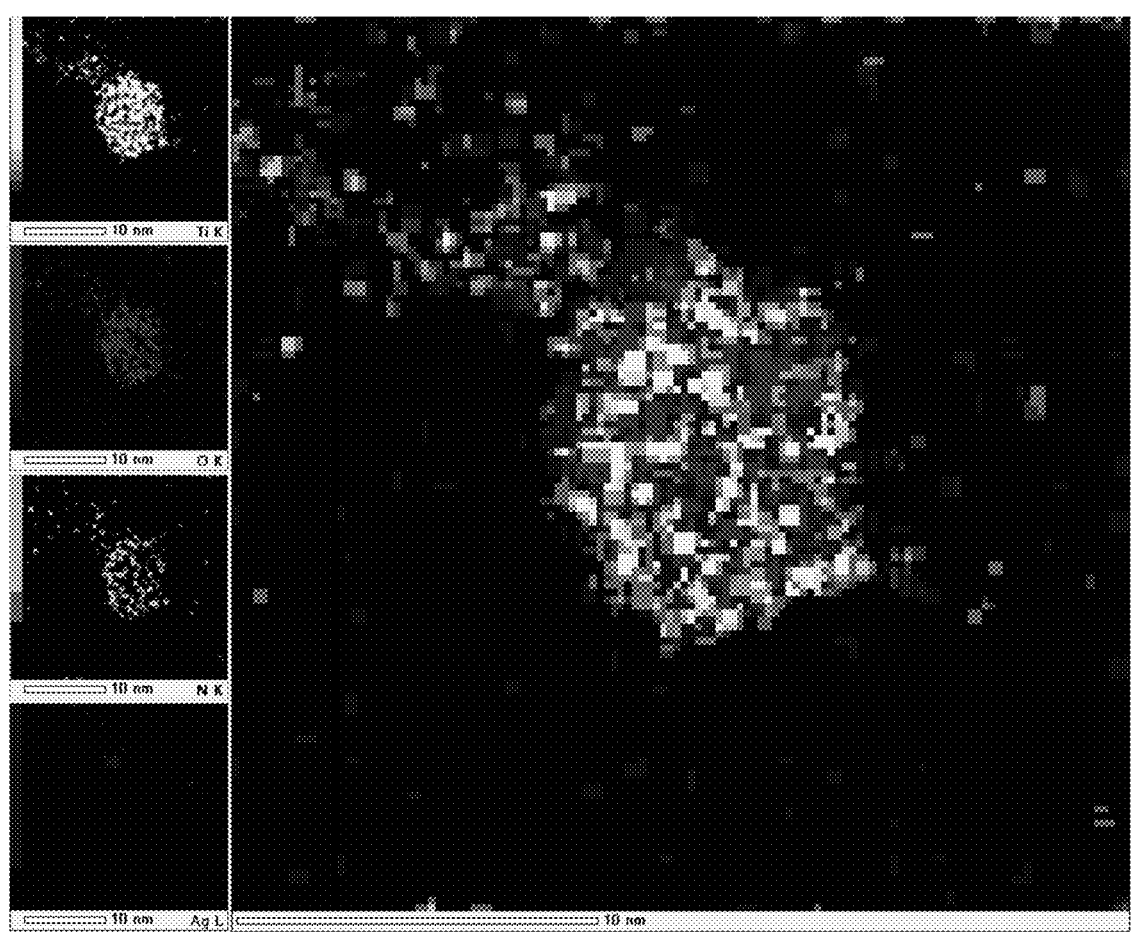
FIG. 6 is a (high-resolution) electron microscope diagram of the sol of Example 2.

The Ag/N/TiO$_2$ composite doped sols of Example 2-Example 5 were tested by using a (high-resolution) electron microscope. The test spectrum of Example 2 is shown in FIGS. 4-6, the test spectrum of Example 4 is shown in FIG. 7, and the test spectrum of Example 5 is shown in FIG. 8 (Example 3 is basically the same as Example 2, so that the test spectrum is not shown).

Figure 4:
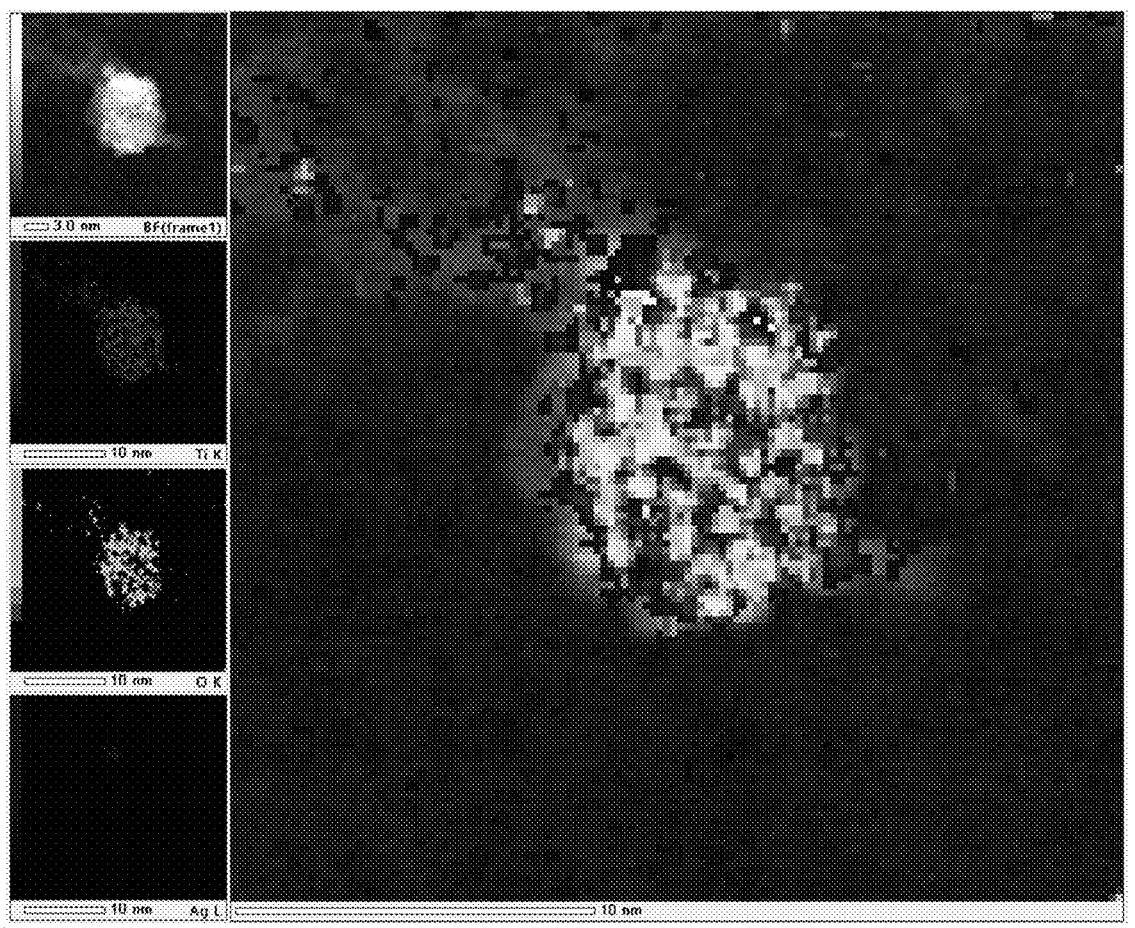
FIG. 4 is a (high-resolution) electron microscope diagram of the sol of Example 2.

It can be seen from FIG. 4 that, Ti and O elements are uniformly distributed to form a TiO$_2$ carrier, and Ag elements are formed on the surface of the TiO$_2$ carrier in a form of atomic clusters and embedded. It can be seen from FIG. 5 that, Ag super atoms (clusters) are formed on the surface of the TiO$_2$ carrier in the form of atomic clusters and embedded, with a size of about 1000 pm to 2000 pm (1 nm to 2 nm). It can be seen from FIG. 6 that, Ti and O elements are uniformly distributed to form a TiO$_2$ carrier, N elements are uniformly distributed in the TiO$_2$ structure to form a doped structure. Ag elements are formed on the surface of the TiO$_2$ carrier in the form of atomic clusters and embedded, and Ag super atoms (clusters) are formed on the surface of the TiO$_2$ carrier in the form of atomic clusters and embedded, with a size of about 1000 pm to 2000 pm (1 nm to 2 nm).

Figure 7:
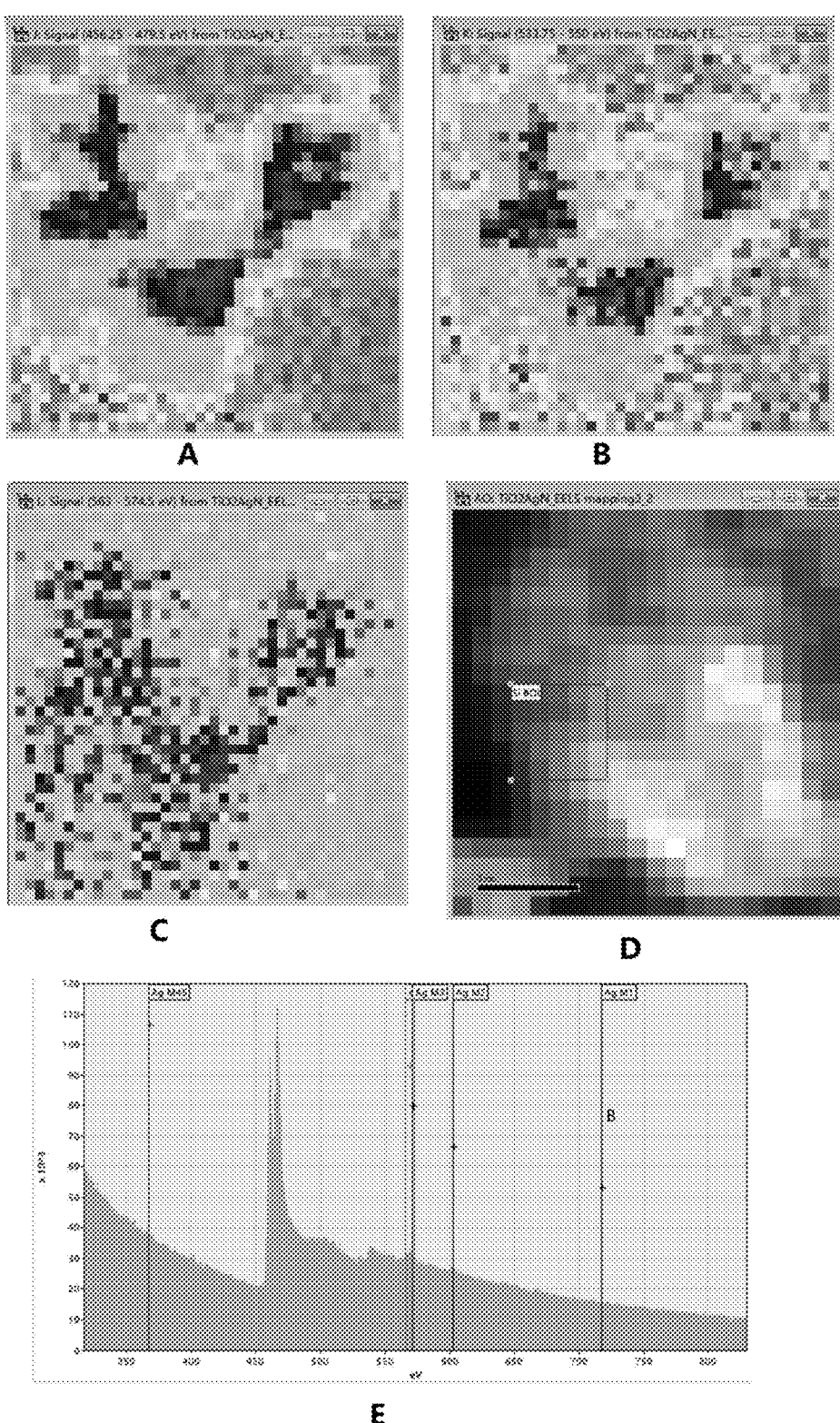
FIG. 7 is a (high-resolution) electron microscope diagram of a sol of Example 4.

In FIG. 7, A represents the distribution of Ti, B represents the distribution of O, C represents the distribution of Ag, D represents the spectral analysis of a random selected area within a range of 2 nm, and E represents the XPS spectrum. As can be seen from FIG. 8, in the EESL mapping of the crystal transmission electron microscope of Example 4, Ti and O elements are uniformly distributed to form a TiO$_2$ carrier. Ag elements are formed on the surface of the TiO$_2$ carrier in the form of smaller atomic clusters and are embedded, and Ag super atoms (clusters) are formed on the surface of the TiO$_2$ carrier in the form of atomic clusters and are embedded, with a size of about 100 pm to 500 pm (0.1 nm to 0.5 nm). The EELS spectral analysis can find that there are obvious silver signals in a random area of 2×2 nm, and the XPS conclusion shows that silver belongs to elementary substance. Accordingly, the silver is present here in atomic clusters that are smaller than the resolution of the system. According to EELS surface scan data, the Ag signal is distributed in a group of pixels of substantially 1×1-2×2, the scale size is 5 pixels=2 nm, the size is estimated to be 0.4-0.8 nm (400-800 pm), the maximum size does not exceed 3×3 pixels, which is estimated to be 1.2 nm (1200 pm) for super atoms.

Figure 8:
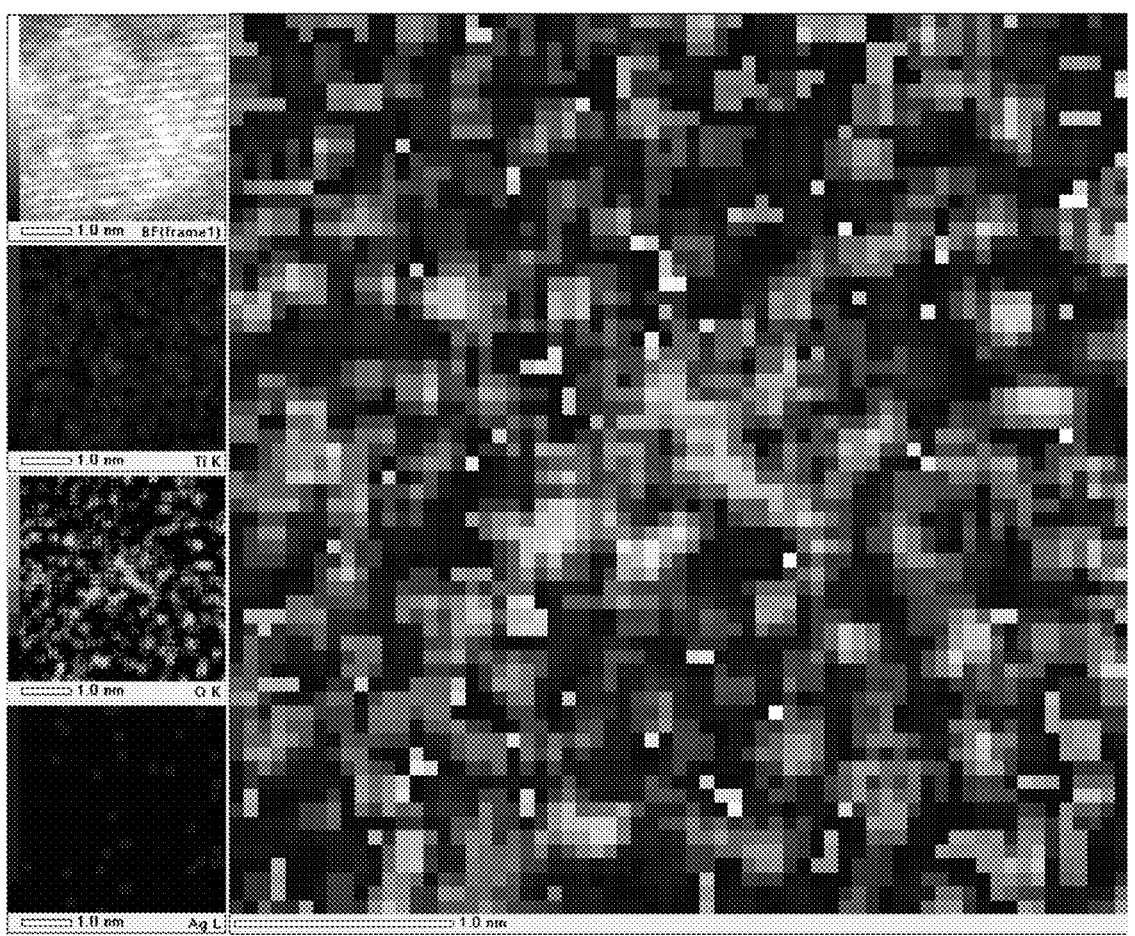
FIG. 8 is a (high-resolution) electron microscope diagram of a sol of Example 5.

It can be seen from FIG. 8 that Ti and O elements are uniformly distributed to form a TiO$_2$ carrier, and the formed TiO$_2$ lattice stripes can be obviously seen. In this case, the Ag elements are formed on the surface of the TiO$_2$ carrier in the form of smaller atomic clusters and embedded, and it can be seen that the Ag super atoms (clusters) are formed on the surface of the TiO$_2$ carrier in the form of atomic clusters and embedded, with a size of about 100 pm to 500 pm (0.1 nm to 0.5 nm).

Figure 9:
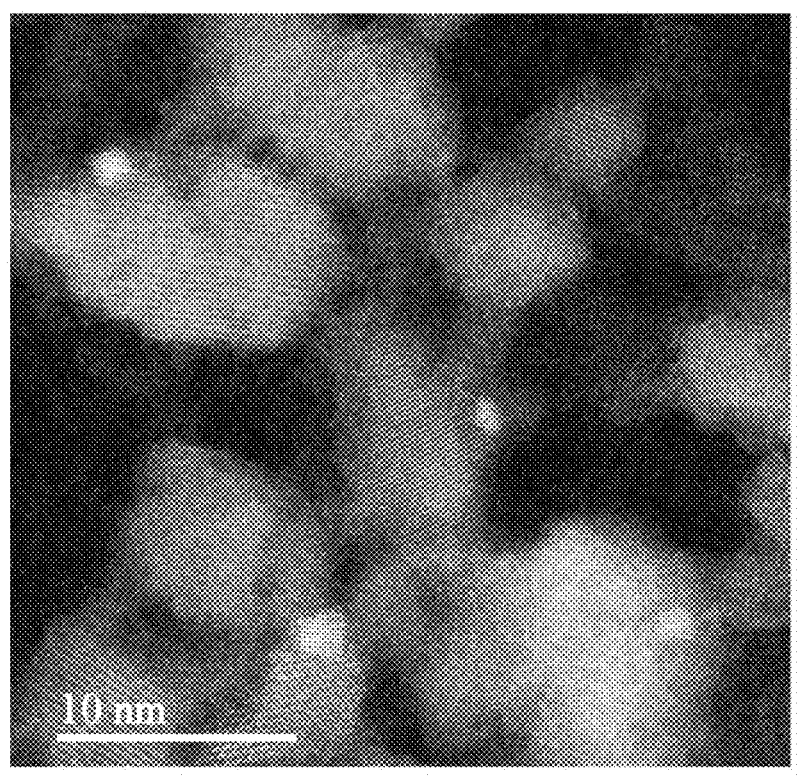
FIG. 9 is a high-angle annular dark field image of a (high-resolution) electron microscope performed on the sol of Example 6.
Figure 9:
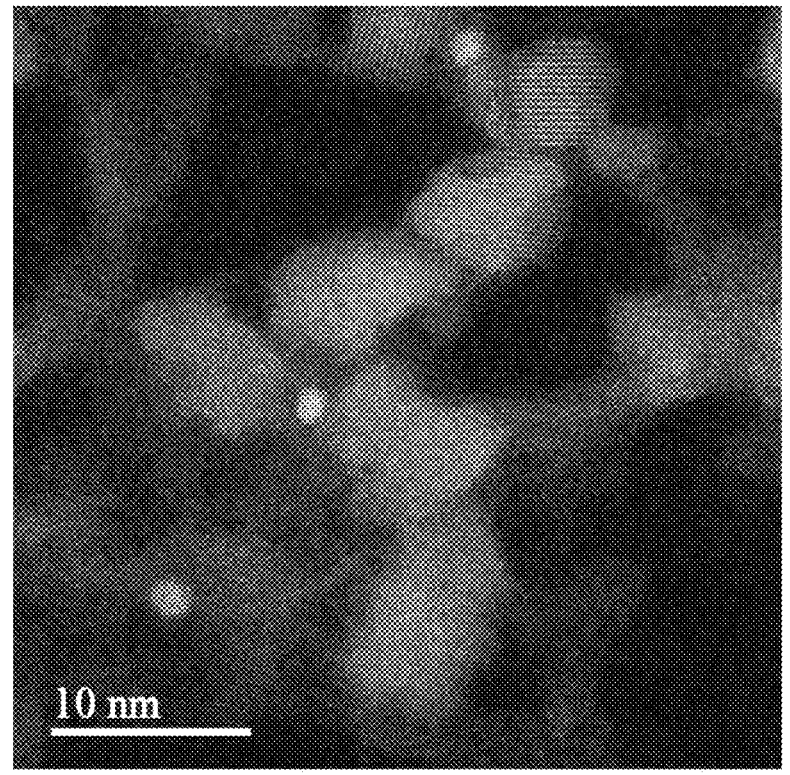

D. High-Angle Annular Dark Field Image Study of (High-Resolution) Electron Microscope The sol of nano titanium dioxide doped with copper super atoms of Example 6 is subjected to (high resolution) electron microscope high-angle annular dark field image study (in the high-angle annular dark field image, the heavier the element is, the brighter the color is, so it can be used to distinguish the TiO$_2$ carrier and the Cu atomic cluster). The test spectrum is shown in FIG. 9. It can be seen from FIG. 9 that, copper atomic clusters with a size of 0.5 nm to 2 nm (highlighted dots) are doped into the TiO$_2$ carrier.

2. Antimicrobial and Antiviral Performance Testing Experiments

A. Study on the Virus Infection Titer of Yellow Leaf Disease

Figure 10:
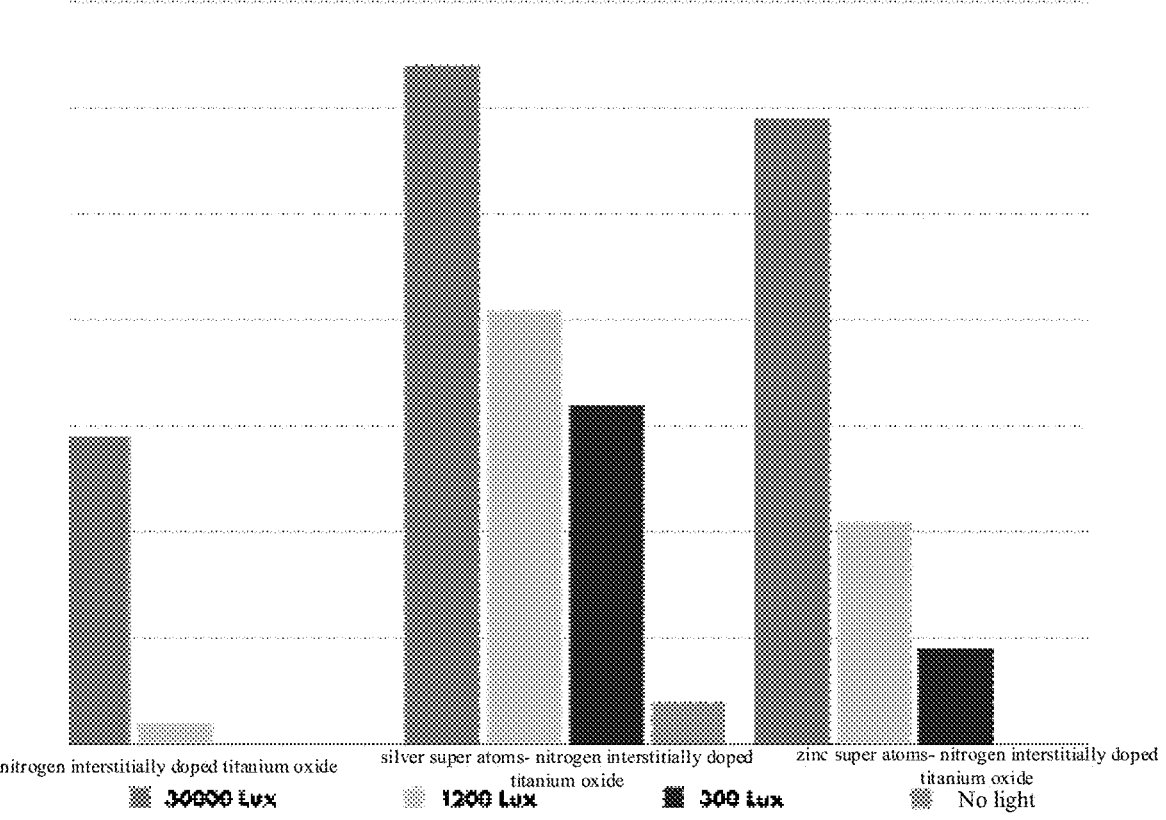
FIG. 10 shows the virus infection titer of yellow leaf disease of the sol of Example 2 at different light intensities.

The antibacterial performance of the Ag/N/TiO$_2$ composite doped sol (i.e., silver super atoms—nitrogen interstitially doped titanium oxide) of Example 2 and the Zn/N/TiO$_2$ composite doped sol (i.e., zinc super atoms—nitrogen interstitially doped titanium oxide) of Example 7 at different light intensities are tested, and the test results are shown in FIG. 10. The virus infection titer after 15 minutes is shown in Table 3, and the virus decline performance value (log)/% after 15 minutes is shown in Table 4.

The manufacturer of the nitrogen interstitially doped titanium oxide is Green Earth Nano Science in Canada.

The nano silver (20 nm) is nano silver synthesized by using a patented strain (CTCCM2012524). The main process includes the following steps: culturing the strain in PDA culture medium, collecting mycelium, adding deionized water at a ratio of 10 mL/g, standing at 37° C. for 24 h, filtering to remove the mycelium, filtering the filtrate with a 0.22 μm filter membrane, adding 1 μg/mL silver nitrate, and silver super atoms—nitrogen interstitially doped titanium oxide (i.e., Ag/N/TiO$_2$ composite doped sol) still has certain bactericidal performance under the condition of no light.

B. Study on Antibacterial Activity of Silver Super-Atomic Titanium Oxide Against Bacteria The sol of nano titanium dioxide doped with silver super atoms of Example 1 is tested for antibacterial activity against different strains, specifically as shown in Table 5:

TABLE 5

| MICROORGANISM STRAIN | MIC VALUE (μG/ML) Minimum inhibitory concentration (calculated by silver super atoms) | MIC VALUE (μG/ML) Minimum inhibitory concentration (calculated by 20 nm nano silver) |
|---|---|---|
| *LISTERIA MONOCYTOGENES* | 6.3 | |
| *ESCHERISCHIA COLI* | 0.39 | 6.00 |
| *SALMONELLA TYPHIMURIUM* | 1.6 | |
| *STAPHYLOCOCCUS AUREUS* | 1.6 | 26.70 |
| *BACILLUS CEREUS* | 0.0001[#] | |
| *LEUCONOSTOC MESENTEROIDES* | 0.098 | |
| *PSEUDOMONAS PUTIDA* | 1.6 | |
| *LACTOBACILLUS BREVIS* | 0.098 | |
| *ASPERGILLUS NIGER* | 1.6 | |
| *PENICILLIUM DISCOLOR* | 1.6 | |
| *ZYGOSACCHAROMYCES BAILII* | 0.0015 | |

[#]The strain still does not grow at the lowest test concentration, and grows well in a control sample and reacting at 37° C. for 48 h. The synthesized nano silver is washed three times with deionized water, with a centrifugation speed of 12000 r/min for 30 min.

TABLE 3

| Viral infection titer after 15 min | | | | |
|---|---|---|---|---|
| Light Intensity | 30000 LUX | 1200 LUX | 300 LUX | No Light |
| nitrogen interstitially doped titanium oxide | 3.5 | 7.0 | 7.0 | 6.9 |
| Ag/N/TiO$_2$ composite doped sol | 0 | 3.1 | 3.8 | 6.5 |
| Zn/N/TiCO$_2$ composite doped sol | 0.5 | 5.1 | 6.1 | 6.9 |
| nano silver (20 nm) | 6.4 | 7.2 | 7.0 | 6.9 |

TABLE 4

| Viral Decline Performance value (log)/% (with nano silver as a control) | | | | |
|---|---|---|---|---|
| Light Intensity | 30000 LUX | 1200 LUX | 300 LUX | No Light |
| nitrogen interstitially doped titanium oxide | 2.9 ↓99.87% | 0.2 ↓36.9% | 0 0% | 0 0% |
| Ag/N/TiO$_2$ composite doped sol | 6.4 ↓99.99996% | 4.1 ↓99.992% | 3.2 ↓99.94% | 0.4 ↓60.2% |
| Zn/N/TiO$_2$ composite doped sol | 5.9 ↓99.9998% | 2.1 ↓99.2% | 0.9 ↓87.4% | 0 0% |
| nano silver (20 nm) | 0 0% | 0 0% | 0 0% | 0 0% |

As can be seen from Table 3 and Table 4 above, the antiviral effect of the super-atomic material of the present disclosure, that is, super atoms doped titanium oxide, is significantly better than that of a single carrier (nitrogen interstitially doped titanium oxide) or a single nano silver, It can be seen from Table 5 that it has excellent bacteriostatic effect on various strains, has lower bacteriostatic concentration, and has both effectiveness and safety.

C. Study on Antibacterial Activity of Silver Super-Atomic Titanium Oxide as Coating on Stainless Steel Against Bacteria (Method JIS 2801)

The sol of the test sample and the sol of the control sample are respectively coated on stainless steel to form coatings, and the antibacterial activities of the coatings against bacteria are detected. The test results are shown in Table 6, the test sample is the sol of nano titanium dioxide doped with silver super atoms of Example 1, and the blank sample is the stainless steel which is not coated with the sol.

TABLE 6

| MICROORGANISM STRAIN | Blank sample Bacterial decline (LOG) in 24 hours | Test sample Bacterial decline (LOG) in 24 hours |
|---|---|---|
| *LISTERIA MONOCYTOGENES* | 0.66 | 5.54[#] |
| *ESCHERISCHIA COLI* | 0.05 | 6.22[#] |
| *SALMONELLA TYPHIMURIUM* | 0.14 | 6.08[#] |
| *STAPHYLOCOCCUS AUREUS* | 0.56 | 6.15[#] |
| *BACILLUS CEREUS* | 0.99 | 5.15[#] |
| *LEUCONOSTOC MESENTEROIDES* | 0.19 | 2.68 |
| *PSEUDOMONAS PUTIDA* | 0.26 | 5.39[#] |
| *LACTOBACILLUS BREVIS* | 0.40 | 5.50[#] |
| *ZYGOSACCHAROMYCES BAILII* | 0.19 | 2.80[#] |

[#]For the test sample, bacteria were all killed to below the limit of detection.

It can be seen from Table 6 that the coating formed by the sol of Example 1 has excellent bacteriostatic effect on various strains, is significantly superior to blank stainless steel without the antibacterial coating, has lower bacteriostatic concentration, and has both effectiveness and safety.

D. Study on Antibacterial Activity of Silver Super-Atomic Titanium Oxide as Coating on Textile Against Bacteria (Method ISO 20743)

The sol of nano titanium dioxide doped with silver super atoms of Example 1 is coated on a textile to form a coating, and the antibacterial activity of the coating against bacteria is detected. The test result is shown in Table 7.

TABLE 7

| MICROORGANISM STRAIN | Antibacterial value Bacterial decline (LOG) in 24 hours |
|---|---|
| LISTERIA MONOCYTOGENES | >3.8 |
| ESCHERISCHIA COLI | >6.6 |
| SALMONELLA TYPHIMURIUM | >5.8 |
| MRSA | >6.2 |
| STAPHYLOCOCCUS AUREUS | >5.6 |
| Klebsiella pneumoniae | >6.3 |
| Aspergillus niger | >4.7 |
| Legionella pneumophila | >5.2 |
| Hemolytic Streptococcus | >6.2 |

It can be seen from Table 7 that the coating formed by the sol of nano titanium dioxide doped with silver super atoms of Example 1 has excellent bacteriostatic effect on various strains.

E. Study on the Antiviral Activity of Silver Super-Atomic Titanium Oxide as Coating on Glass Against Viruses (Method ISO 21702)

The sol of the test sample and the sol of the control sample are coated on glass to form coatings, and the antiviral activity against viruses are detected. The test results are shown in Table 8. The control sample is a commercially available silver ion super-atomic material (Fujifilm, Japan), and the test sample is the sol of nano titanium dioxide doped with silver super atoms of Example 1.

TABLE 8

| VIRUS | Sample | Virus infection titer LOG | Antiviral value LOG |
|---|---|---|---|
| A/PR/8/34 (H1N1) ATCC VR-1469 | control sample - after contact | 5.64 | / |
| | control sample - after 1 hour | 5.64 | / |
| | control sample - after 24 hours | 5.10 | / |
| | test sample - after 1 hour | 5.06 | 0.6 (>75%) |
| | test sample - after 24 hours | 0.80 | 4.3 (>99.995%) |

It can be seen from Table 8 that the sol of nano titanium dioxide doped with silver super atoms of Example 1 has the antiviral activity significantly superior to that of the control sample.

F. Study on the Antiviral Activity of Copper Super-Atomic Titanium Oxide as Coating on Glass Against Viruses (Method ISO 21702)

The sol of nano titanium dioxide doped with copper super atoms of Example 6 is coated on glass to form a coating, and the antiviral activity of the coating against viruses is detected by measuring twice each time and recording the average value, and the test results are shown in Table 9.

TABLE 9

| TGEV CORONAVIRUS | $1^{st}$ | $2^{nd}$ | $1^{st}$ | $2^{nd}$ | $1^{st}$ | $2^{nd}$ |
|---|---|---|---|---|---|---|
| | 1 hour | | 8 hours | | 24 hours | |
| Virus titer LG $LD_{50}$ | 5.25 | 4.95 | 3.45 | 2.7 | ≤0.30 | ≤0.30 |
| Average Virus titer | 6.10 ± 0.31 ml | | 4.08 ± 0.32 ml | | ≤1.30/ml | |
| Virus titer decline value | n/a | | 2.02(>99%) | | 4.8 (>99.998%) | |

It can be seen from Table 9 that the coating formed by the sol of nano titanium dioxide doped with copper super atoms of Example 6 has excellent antiviral effect on various viruses.

G. Study on Antibacterial Activity of Copper Super-Atomic Titanium Oxide as Coating on Glass Against Bacteria (Method ISO 22196)

The sol of nano titanium dioxide doped with copper super atoms of Example 6 is coated on glass to form a coating, and the antibacterial activity of the coating against bacteria is detected. The test result is shown in Table 10.

TABLE 10

| MICROORGANISM STRAIN | Antibacterial value Bacterial decline (LOG) in 24 hours |
|---|---|
| STAPHYLOCOCCUS AUREUS | >6.0 |

It can be seen from Table 10 that the coating formed by the sol of nano titanium dioxide doped with copper super atoms of Example 6 has excellent bacteriostatic effect on various strains.

H. Testing Silver Super-Atomic Titanium Oxide in a Liquid State by Directly Mixing Virus for 60 Min (Method EN 14476)

The antiviral capacity of the sol of nano titanium dioxide doped with silver super atoms of Example 1 is tested, and the test results are shown in Table 11 and Table 12.

TABLE 11

| VIRUS | SAMPLE | Virus infection titer LOG | Antiviral value LOG |
|---|---|---|---|
| TGEV CORONAVIRUS | Initial concentration | 6.43 | / |
| | test sample - after 1 hour | <2.33 | >4.10 (>99.99%) |

TABLE 12

| VIRUS | SAMPLE | Virus infection titer LOG | Antiviral value LOG |
|---|---|---|---|
| VACCINIA | Initial concentration | 6.95 | / |
| | test sample - after 1 hour | <2.33 | >4.62 (>99.99%) |

It can be seen from Tables 11 and 12 that the sol of nano titanium dioxide doped with silver super atoms of Example 1 has excellent virus inhibiting effect.

3. Study on Monodispersity

Figure 11:
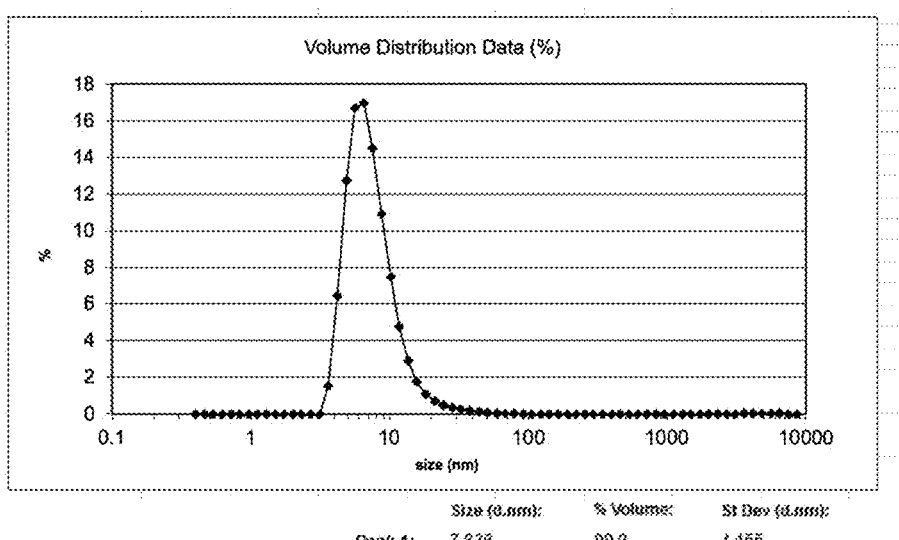
FIG. 11 is a molecular correlation spectrum of a sol of Example 1.
Figure 12:
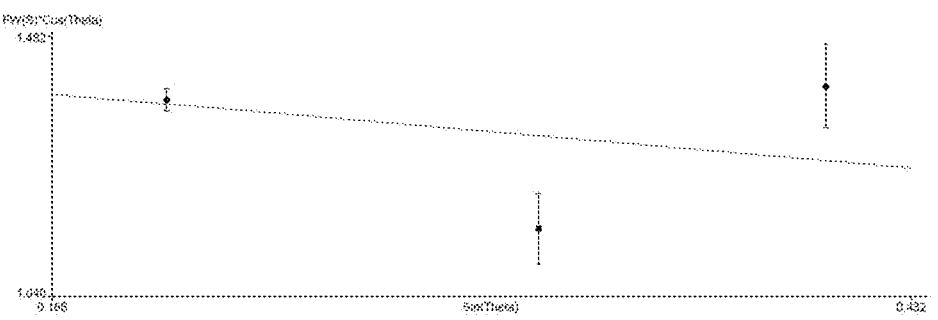
FIG. 12 is an X-Ray Diffraction (XRD) pattern of the sol of Example 1.
Figure 12:
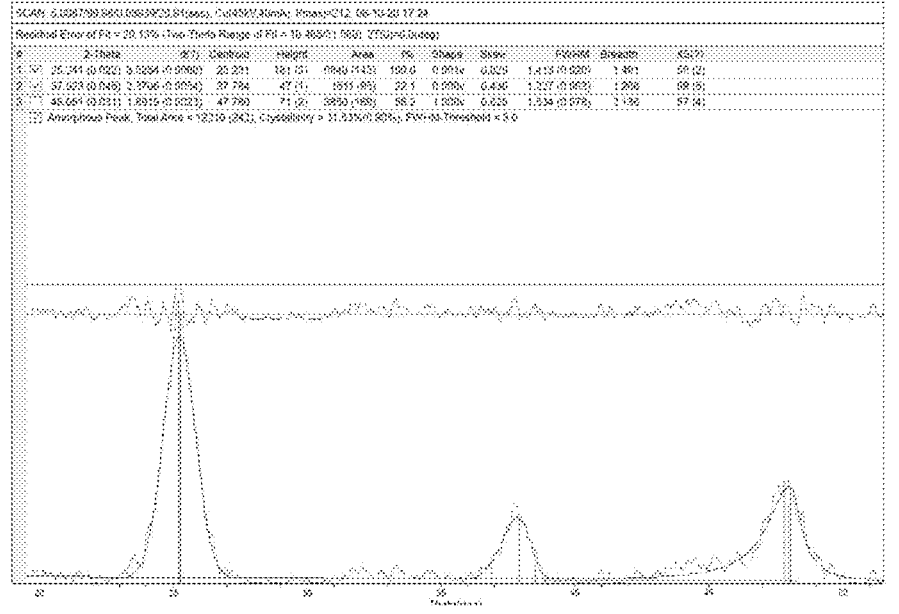

DLS/PCS (molecular correlation spectrum) of the sol of Example 1 is shown in FIG. 11, from which it can be seen that the DLS/PCS (molecular correlation spectrum) result shows that the mean value of the kinetic diameters (secondary particle diameters) of the particles in the sol is 7.838 nm. The XRD results are shown in FIG. 12, from which it can be seen that the XRD results calculate the grain size (primary particle diameter) of the crystals to be 5.4 nm according to the Scheller formula, and the main crystal plane size to be 5.8/6.9/5.7 nm to thereby give an agglomeration index of 7.838/5.4=1.45<2 as a nearly monodisperse state.

4. Study on Surface Charge

Figure 13:
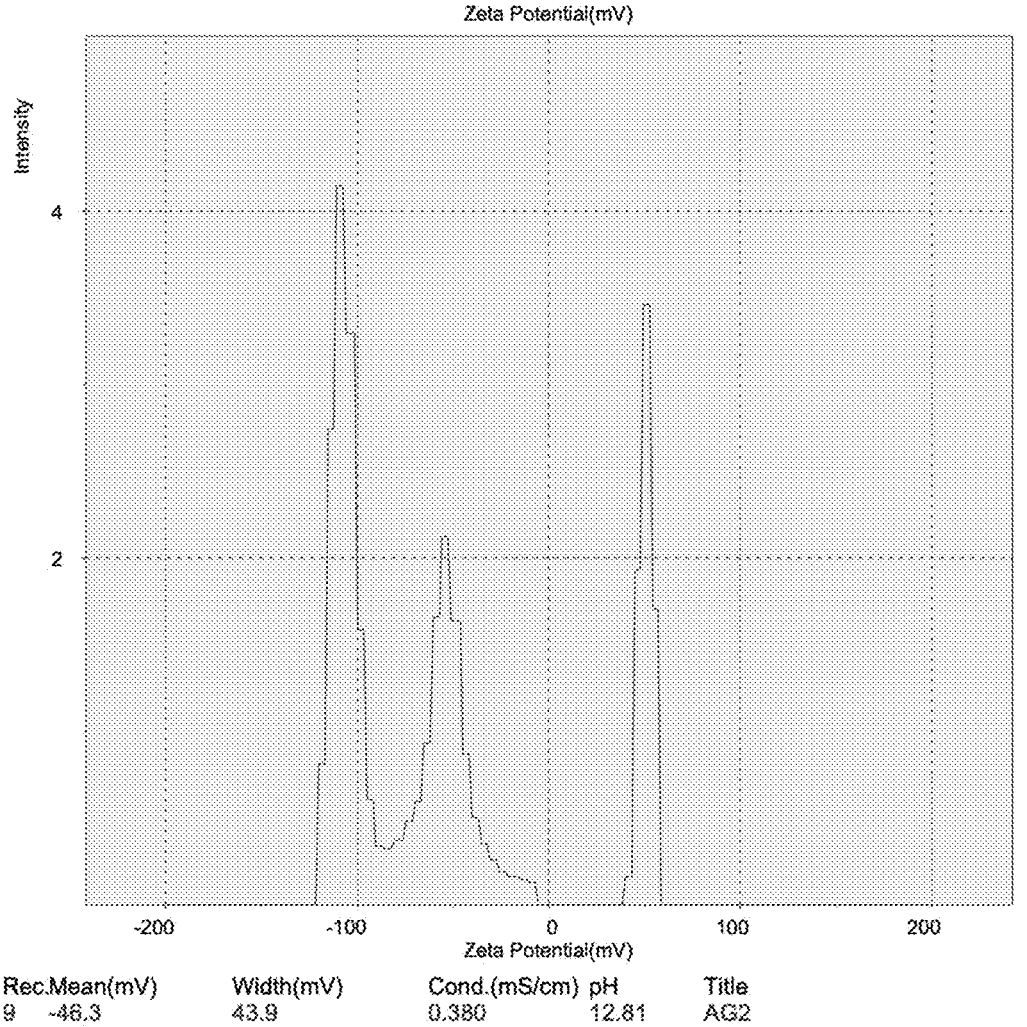
FIG. 13 shows the surface charge values of the super-atomic material in the sol of Example 1.

The surface potential detection of the sol of Example 1 is shown in FIG. 13, from which it can be seen that the absolute value of the surface charge of the super-atomic material in the sol of nano titanium dioxide doped with silver super atoms of Example 1 is greater than or equal to 15 mV, which can effectively avoid agglomeration and enhance dispersibility.

The technical features of the above-described embodiments can be combined arbitrarily. To simplify the description, not all possible combinations of the technical features in the above embodiments are described. However, all of the combinations of these technical features should be considered as being fallen within the scope of the present application, as long as such combinations do not contradict with each other.

The foregoing embodiments merely illustrate some embodiments of the present application, and descriptions thereof are relatively specific and detailed. However, it should not be understood as a limitation to the patent scope of the present application. It should be noted that, a person of ordinary skill in the art may further make some variations and improvements without departing from the concept of the present application, and the variations and improvements falls in the protection scope of the present application. Therefore, the protection scope of the present application shall be subject to the appended claims.

What is claimed is:

1. A super-atomic material, comprising a carrier and super atoms doped in the carrier; wherein the super atoms are one or more selected from the group consisting of silver super atoms, copper super atoms, zinc super atoms, and rare earth element super atoms, the super atoms have a dimension of 100 pm to 2000 pm; the carrier is an inorganic carrier having a particle size of 1 nm to 10 nm, the carrier has a two-dimensional projection form of quadrilateral, spindle-shaped, or circular shape; the carrier has a charge on a surface thereof, and an absolute value of the charge is greater than or equal to 15 mV.

2. The super-atomic material of claim 1, wherein the super atoms have a chemical valence of 0.

3. The super-atomic material of claim 1, wherein the carrier is a carrier having quantum size.

4. The super-atomic material of claim 1, wherein the carrier is one or more selected from the group consisting of titanium oxide, titanium nitride, and titanium peroxide.

5. The super-atomic material of claim 1, wherein a width of at least one crystal face of the carrier is less than 10 nm, the carrier is a photocatalytic material; and
the carrier is a carrier modified by a silicon-based substance.

6. The super-atomic material of claim 1, wherein the carrier is anatase titanium dioxide nanocrystal.

7. The super-atomic material of claim 6, wherein the carrier is nitrogen interstitially doped titanium oxide.

8. The super-atomic material of claim 1, wherein the super atoms are silver super atoms, and an X-ray photoelectron spectroscopy (XPS) spectrum of the super-atomic material has peaks at 368.000±0.200 and 374.000±0.200; or the super atoms are copper super atoms, and an X-ray photoelectron spectroscopy (XPS) spectrum of the super-atomic material has peaks at 933±0.200 and 953±0.200.

9. A sol, comprising the super-atomic material of claim 1.

10. The sol of claim 9, wherein a ratio of dynamic light scattering (DLS) average particle size of the super-atomic material to X-Ray Diffraction (XRD) average particle size of the super-atomic material is less than 4.

11. A method for preparing the sol according to claim 9, comprising:
mixing metal salt, a carrier precursor, and water to obtain a mixed solution; and treating the mixed solution by the following to prepare a sol:
heating the mixed solution to a temperature of 120° C. to 250° C. and increasing a pressure to 15 bar to 60 bar within 200 s;
reducing the pressure to 10 bar to 40 bar, controlling the temperature at 130° C. to 200° C., and preserving heat for 270 s to 330 s; and
cooling to a temperature of 5° C. to 50° C. within 60 s;
wherein the metal salt is an organic salt or an inorganic salt containing silver, copper, zinc or rare earth elements;
the carrier precursor is an inorganic acid or an inorganic acid complex capable of generating an inorganic carrier by hydrothermal reaction.

12. The method of claim 11, wherein in the heating, the mixed solution is heated to a temperature of 150° C. to 200° C. and a pressure is increased to 15 bar to 60 bar within 200 s;
in the heat preserving, the pressure is reduced to 10 bar to 40 bar, the temperature is controlled at 150° C. to 180° C., and the heat is preserved for 270 s to 330 s;
in the cooling, a temperature is cooled to 5° C. to 50° C. within 60 s; and
the mixing metal salt, the carrier precursor, and water to obtain the mixed solution comprises:
mixing the metal salt and water to obtain a first solution;
mixing the carrier precursor and water to obtain a second solution; and
dropping the first solution into the second solution at a speed of 100 mL/min to 200 mL/min, and stirring to obtain a mixed solution.

13. The method of claim 11, wherein the mixing metal salt, the carrier precursor, and water further comprises adding a silicon-based substance; and/or the mixing metal salt, the carrier precursor, and water further comprises adding ammonia, trimethylamine, or ammonium salt.

14. An antimicrobial and antiviral coating, comprising the super-atomic material of claim 1.

15. An antimicrobial and antiviral product, comprising a substrate and a super-atomic material loaded on the substrate, wherein the super-atomic material is the super-atomic material of claim 1.

16. The super-atomic material of claim 1, wherein the super atoms have a dimension of 100 pm to 500 pm.

17. The super-atomic material of claim 1, wherein the super atoms have a dimension of 100 pm to 1200 pm.

18. A super-atomic material, comprising a carrier and super atoms doped in the carrier; wherein the super atoms have a chemical valence of 0, the super atoms are one or more selected from the group consisting of silver super atoms, copper super atoms, zinc super atoms, and rare earth element super atoms, the super atoms have a dimension of 100 pm to 3000 pm; the carrier is an inorganic carrier and the carrier is a carrier modified by a silicon-based substance.

19. The super-atomic material according to claim 18, wherein the silicon-based substance is one or more selected from the group consisting of tetramethoxysilane, tetraethoxysilane, γ-glycidyl etheroxypropyltrimethoxysilane, γ-methacryloyloxypropyltrimethoxysilane, γ-aminopropyltriethoxysilane, and trimethoxysilane.

20. A super-atomic material, comprising a carrier and super atoms doped in the carrier; wherein the super atoms have a chemical valence of 0, the super atoms are one or more selected from the group consisting of copper super atoms, zinc super atoms, and rare earth element super atoms, the super atoms have a dimension of 100 pm to 3000 pm; the carrier is an inorganic carrier.

\* \* \* \* \*